United States Patent
Harada et al.

(10) Patent No.: US 11,265,831 B2
(45) Date of Patent: Mar. 1, 2022

(54) TERMINAL AND RADIO COMMUNICATION METHOD FOR RECEIVING PAGING CHANNEL, AND BASE STATION FOR TRANSMITTING PAGING CHANNEL

(71) Applicant: NTT DOCOMO, INC., Tokyo (JP)

(72) Inventors: Hiroki Harada, Tokyo (JP); Ryosuke Osawa, Tokyo (JP); Tomoya Ohara, Tokyo (JP); Kazuaki Takeda, Tokyo (JP); Satoshi Nagata, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/322,608

(22) PCT Filed: Aug. 3, 2017

(86) PCT No.: PCT/JP2017/028160
§ 371 (c)(1),
(2) Date: Feb. 1, 2019

(87) PCT Pub. No.: WO2018/025946
PCT Pub. Date: Feb. 8, 2018

(65) Prior Publication Data
US 2019/0182784 A1 Jun. 13, 2019

(30) Foreign Application Priority Data
Aug. 4, 2016 (JP) .............................. JP2016-154016

(51) Int. Cl.
*H04W 56/00* (2009.01)
*H04W 68/02* (2009.01)
(Continued)

(52) U.S. Cl.
CPC ............ *H04W 56/001* (2013.01); *H04B 7/04* (2013.01); *H04B 7/0617* (2013.01);
(Continued)

(58) Field of Classification Search
CPC ............... H04W 56/001; H04W 16/28; H04W 72/1278; H04W 68/02; H04W 88/02;
(Continued)

(56) References Cited

U.S. PATENT DOCUMENTS 6,233,466 B1    5/2001  Wong et al.
2010/0040015 A1*  2/2010  Ernstrom .............. H04W 56/00
                                                            370/330
(Continued)

FOREIGN PATENT DOCUMENTS

KR  10-2010-0128323 A   12/2010
KR  10-2014-0100496 A   8/2014
KR  10-2016-0013031 A   2/2016

OTHER PUBLICATIONS

International Search Report issued for PCT/JP2017/028160, dated Oct. 17, 2017 (3 pages).

(Continued)

*Primary Examiner* — Walli Z Butt
(74) *Attorney, Agent, or Firm* — Osha Bergman Watanabe & Burton LLP

(57) ABSTRACT

The present invention is designed so that beamforming can be executed properly even when user terminals are in idle mode. A user terminal communicates with a radio base station that uses beamforming, and has a receiving section that receives a synchronization signal and/or a broadcast channel and a paging channel, which are transmitted using a single beam pattern or a plurality of beam patterns; and a control section that exerts control so that at least part of the paging channel is received based on a resource where the synchronization signal and/or the broadcast channel are allocated.

9 Claims, 18 Drawing Sheets

(51) Int. Cl.
    *H04B 7/04*     (2017.01)
    *H04W 16/28*    (2009.01)
    *H04B 7/06*     (2006.01)
    *H04W 72/12*    (2009.01)
    *H04W 88/02*    (2009.01)
    *H04W 88/08*    (2009.01)

(52) U.S. Cl.
    CPC .......... *H04W 16/28* (2013.01); *H04W 68/02* (2013.01); *H04W 72/1278* (2013.01); *H04W 88/02* (2013.01); *H04W 88/08* (2013.01); Y02D 30/70 (2020.08)

(58) Field of Classification Search
    CPC ............. H04W 88/08; H04W 52/0219; H04W 52/0216; H04W 76/28; H04W 68/005; H04B 7/04; H04B 7/0617; H04B 7/0408; Y02D 70/00
    See application file for complete search history.

(56) References Cited

U.S. PATENT DOCUMENTS

| | | |
|---|---|---|
| 2011/0051668 A1 | 3/2011 | Lee et al. |
| 2013/0114484 A1 | 5/2013 | Suzuki et al. |
| 2016/0119895 A1* | 4/2016 | Agiwal ................. H04W 68/02 455/458 |
| 2017/0251443 A1* | 8/2017 | Shin ...................... H04L 5/0098 |
| 2017/0311284 A1* | 10/2017 | Basu Mallick ....... H04W 68/02 |
| 2018/0351624 A1* | 12/2018 | Hakola ................. H04B 7/0695 |
| 2020/0077359 A1* | 3/2020 | Agiwal ............... H04W 68/025 |
| 2020/0169980 A1* | 5/2020 | Du .......................... H04W 4/06 |

OTHER PUBLICATIONS

Wrritten Opinion issued for PCT/JP2017/028160, dated Oct. 17, 2017 (3 pages).

3GPP TS 36.300 V12.4.0; 3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 12); Dec. 2014 (251 pages).

Extended European Search Report issued in counterpart European Patent Application No. 17837047.4 dated Jan. 28, 2020 (6 pages).

Office Action in counterpart Korean Patent Application No. 10-2019-7003308 dated Feb. 1, 2021 (12 pages).

Office Action issued in counterpart Korean Application No. 10-2019-7003308 dated Aug. 25, 2021 (12 pages).

Office Action issued in counterpart Chinese Application No. 201780049024.8 dated Sep. 2, 2021 (12 pages).

* cited by examiner

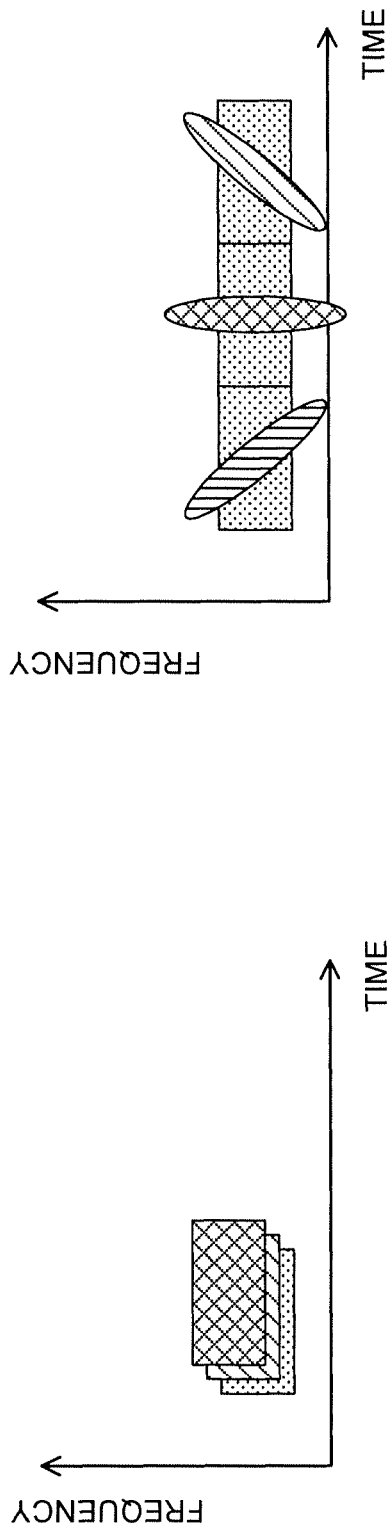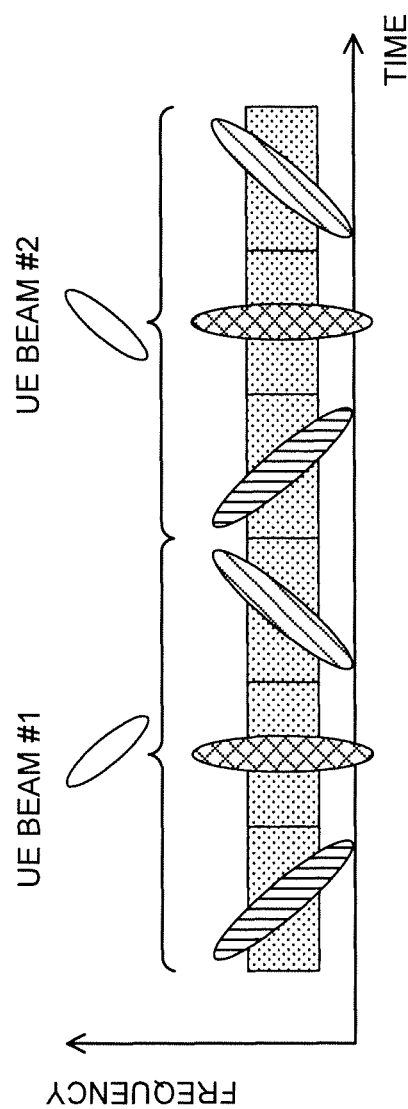

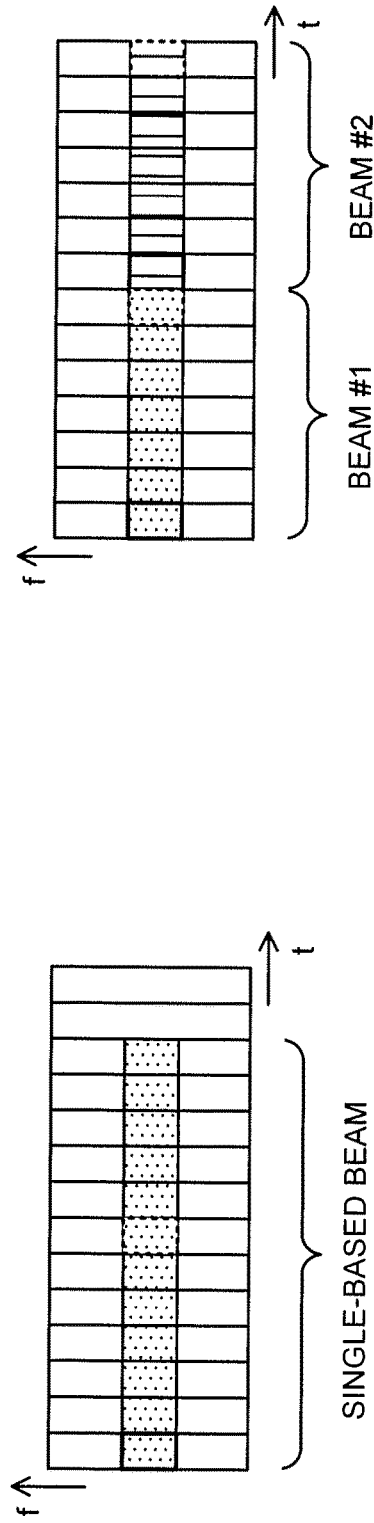
FIG. 12A
FIG. 12B
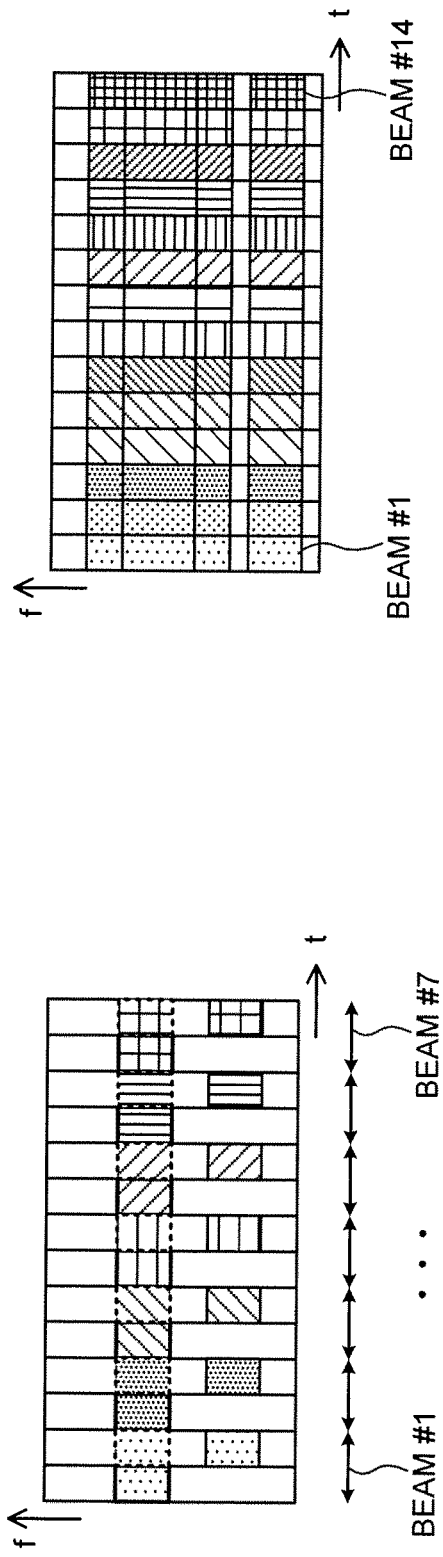
FIG. 12C
FIG. 12D

TERMINAL AND RADIO COMMUNICATION METHOD FOR RECEIVING PAGING CHANNEL, AND BASE STATION FOR TRANSMITTING PAGING CHANNEL

TECHNICAL FIELD

The present invention relates to a user terminal and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "New RAT (Radio Access Technology)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB (eNodeB)) are configured in a user terminal (UE (User Equipment)).

Meanwhile, in LTE Rel. 12, dual connectivity (DC), by which multiple cell groups (CGs) are formed by different radio base stations and configured in UE, is also introduced. Each cell group is comprised of at least one cell (CC). Since multiple CCs of different radio base stations are aggregated in DC, DC is also referred to as "inter-base station CA (inter-eNB CA)."

Also, in existing LTE systems (for example, LTE Rel. 8 to 13), in order to reduce the power consumption of user terminals, the operation of discontinuous reception (DRX) in idle mode is supported. Also, user terminals in idle mode control measurements of RSRP/RSRQ for cell reselection, monitoring/reception of the paging channel (PCH), and so on, based on the DRX cycle. Incoming calls, changes of broadcast information (system information), ETWS, and so on are reported to user terminal via the paging channel.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communication systems (for example, 5G, NR, etc.) are anticipated to implement various radio communication services by fulfilling various requirements (for example, ultra-high speed, large capacity, ultra-low latency, and so on).

For example, in 5G, research has been conducted to provide radio communication services, referred to as "eMBB (enhanced Mobile Broad Band)," "IoT (Internet of Things)," "MTC (Machine Type Communication)," "M2M (Machine To Machine)," "URLLC (Ultra Reliable and Low Latency Communications)" and so on. Note that M2M may be referred to as "D2D (Device To Device)," "V2V (Vehicle To Vehicle)" and so on, depending on what communication device is used. To fulfill the requirements for various types of communication such as listed above, studies are in progress to design new communication access schemes (new RAT (Radio Access Technology)).

For 5G, studies are underway to provide services using a very high carrier frequency of 100 GHz, for example. Generally speaking, it is more difficult to secure coverage when the carrier frequency increases. Reasons for this include that the distance-induced attenuation becomes more severe and the rectilinearity of radio waves becomes stronger, the transmission power density decreases because ultra-wideband transmission is performed, and so on.

Therefore, in order to fulfill the requirements for various types of communication such as those mentioned above even in high frequency bands, there are on-going studies to examine the use of massive MIMO (Multiple Input Multiple Output), which uses a very large number of antenna elements. When a very large number of antenna elements are used, beams (antenna directivities) can be formed by controlling the amplitude and/or the phase of signals transmitted/received in each element. This process is also referred to as "beamforming (BF)," and makes it possible to reduce the propagation loss of radio waves.

A radio base station that uses beamforming can communicate properly by applying appropriate transmitting beams (beam patterns) to each user terminal and transmitting and/or receiving signals accordingly. Meanwhile, the radio base station cannot determine which beam pattern is appropriate for user terminals that are in idle mode. Therefore, a method for transmitting and/or receiving signals that are suitable for user terminals in idle mode and so on, by using beamforming, is in demand.

The present invention has been made in view of the above, and it is therefore an object of the present invention to provide a user terminal, a radio base station and a radio communication method that allow beam forming to be executed properly even when user terminals are in idle mode.

Solution to Problem

According to one aspect of the present invention, a user terminal communicates with a radio base station that uses beamforming, and has a receiving section that receives a synchronization signal and/or a broadcast channel and a paging channel, which are transmitted using a single beam pattern or a plurality of beam patterns; and a control section that exerts control so that at least part of the paging channel is received based on a resource where the synchronization signal and/or the broadcast channel are allocated.

Advantageous Effects of Invention

According to the present invention, it is possible to execute beamforming properly even when user terminals are in idle mode.

BRIEF DESCRIPTION OF DRAWINGS

FIG. 4A is a diagram to show an example of single BF, and FIGS. 4B and 4C are diagrams to show examples of multiple BF;

FIG. 12A is a diagram to show a paging channel monitoring method that supports one beam, FIG. 12B is a diagram to show a paging channel monitoring method that supports two beams, FIG. 12C is a diagram to show a paging channel monitoring method that supports seven beams, and FIG. 12D is a diagram to show a paging channel monitoring method that supports fourteen beams;

DESCRIPTION OF EMBODIMENTS

Figure 1:
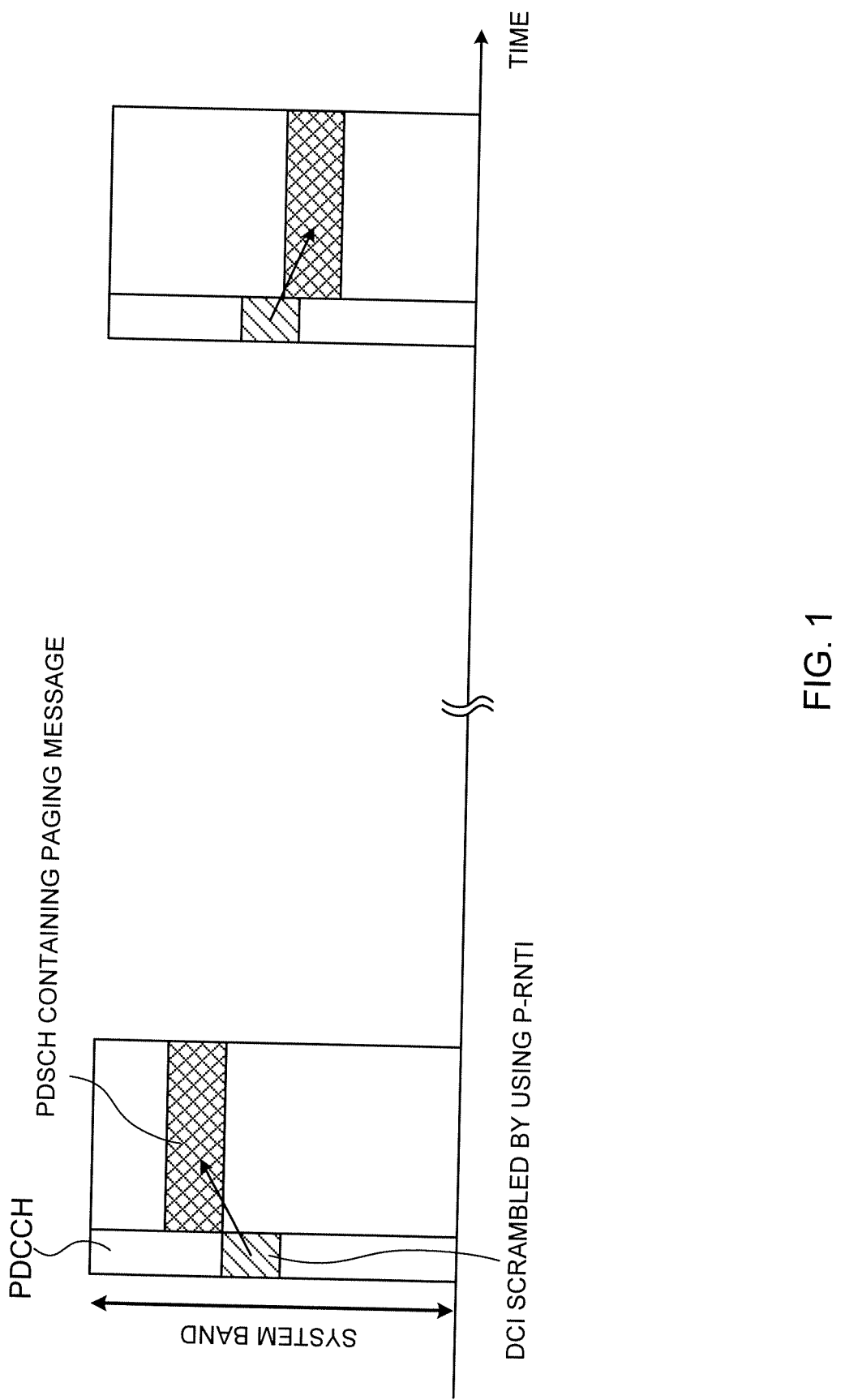
FIG. 1 is a diagram to show an example of the method of transmitting and receiving paging information in existing systems.

FIG. 1 shows an example of transmitting and receiving paging information in existing LTE systems (before Rel. 13). Existing LTE systems support reporting changes in system information to user terminals in RRC-connected mode and user terminals in RRC idle mode by using paging information (paging messages).

In existing LTE systems, a user terminal in RRC idle mode detects downlink control information (DCI) that is transmitted in a common search space (common SS) in a downlink control channel (PDCCH), at a predetermined paging timing. Then, based on the scheduling information (DL assignment) contained in this DCI, the user terminal acquires a paging message that is transmitted in a downlink shared channel (PDSCH). Note that, as for the DCI, DCI (DCI format 1A or DCI format 1C) that is scrambled by using a paging identifier (P-RNTI) is used.

The paging message that is transmitted from the radio base station can contain notifications of each user terminal's paging record, information to order a change of system information (for example, SystemInfoModification), ETWS (Earthquake and Tsunami Warning System), CMAS (Commercial Mobile Alert Service), EAB (Extended Access Barring) and so on.

The paging timing at which a user terminal detects the paging channel is configured based on a paging occasion (PO), which specifies the subframe in which P-RNTI-scrambled DCI is transmitted, and the radio frame (PF (Paging Frame)) in which the PO is contained. The user terminal monitors for the paging channel based on the PO and the PF. When the user terminal is in idle mode, the user terminal can save its power consumption by performing the receiving operation (DRX) only during the period the user terminal needs to monitor for the paging channel, and by assuming sleep mode or power-save mode during other periods. Note that the paging channel may be regarded as a configuration that accommodates a downlink control channel, which transmits DCI that is scrambled with P-RNTIs, and a downlink shared channel, allocation of which is commanded by this DCI, and in which the paging message is transmitted.

Figure 2:
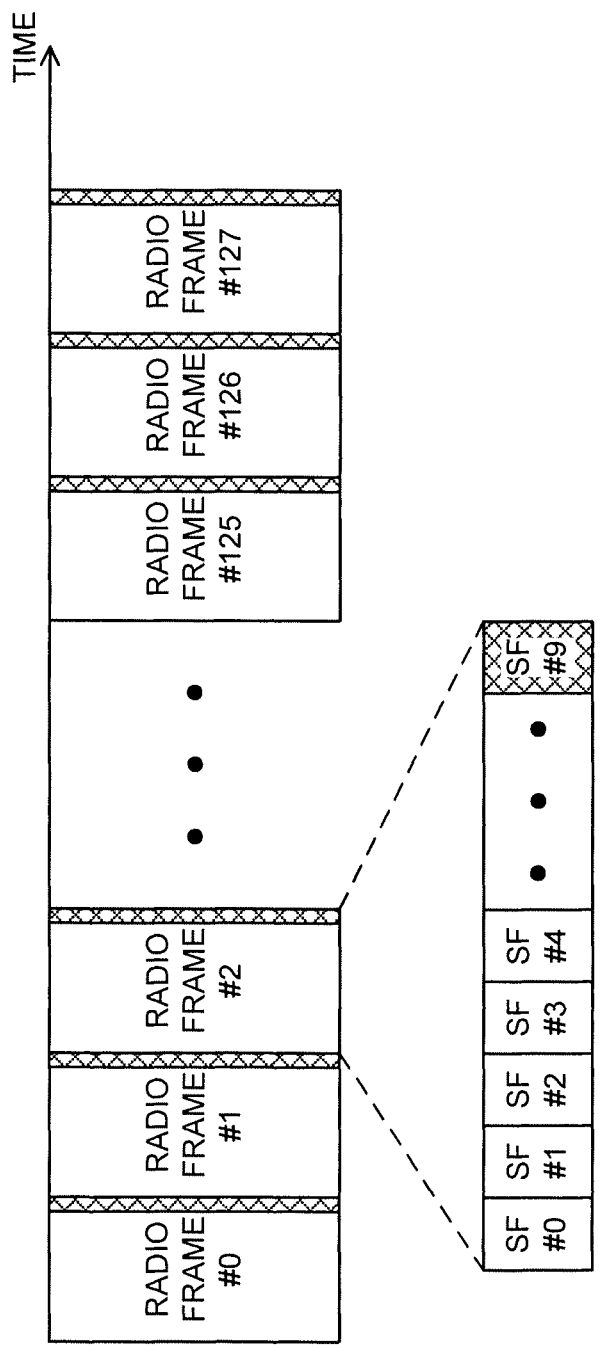
FIG. 2 is a diagram to show an example of the method of allocating paging information in existing systems.

Each user terminal's paging timing (PF and PO) is determined by an IMSI (International Mobile Subscriber Identity), a paging cycle (T) and a variable (nB). For example, in the event the DRX cycle is 128 radio frames and nB=T, a given user terminal that uses FDD exerts control so that paging channel receiving processes take place in a predetermined subframe (for example, subframe #9) in each radio frame (see FIG. 2). Note that, in the event FDD is used, as shown in FIG. 2, synchronization signals (PSS/SSS) are transmitted in subframes #0 and #5, and the broadcast channel (PBCH), to which the MIB (Master Information Block) is allocated, is transmitted in subframe #0.

As described above, in existing LTE systems, the receiving operation for the paging channel is executed at paging timings that are determined based on predetermined parameters (IMSI, paging cycle (T), variable (nB), etc.).

Now, future radio communication systems (for example, 5G, NR, etc.) are anticipated to implement various radio communication services by fulfilling various requirements (for example, ultra-high speed, large capacity, ultra-low latency, etc.). For example, for future radio communication systems, as mentioned earlier, studies are in progress to perform communication by using beamforming (BF).

BF can be classified into digital BF and analog BF. Digital BF refers to a set of techniques where precoding signal processing is executed on baseband signals (for digital signals). In this case, inverse fast Fourier transform (IFFT)/digital-to-analog conversion (DAC)/RF (Radio Frequency) need to be carried out in parallel processes, as many as the number of antenna ports (RF chains). Meanwhile, it is possible to form a number of beams to match the number of RF chains at an arbitrary timing.

Analog BF refers to a set of techniques to apply phase shifters to RF signals. In this case, since it is only necessary to rotate the phase of RF signals, analog BF can be implemented with simple and inexpensive configurations, but it is not possible to form multiple beams at the same time. To be more specific, when analog BF is used, each phase shifter can only form one beam at a time.

Therefore, if a base station (for example, referred to as an "eNB (evolved Node B)," a "BS (Base Station)," and so on) has only one phase shifting device, only one beam can be formed at a given time. It then follows that, when multiple beams are transmitted using analog BF alone, these beams cannot be transmitted simultaneously using the same resources, and the beams need to be switched, rotated and so on, over time.

Note that it is also possible to adopt a hybrid BF configuration, which combines digital BF and analog BF. While studies are on-going to introduce massive MIMO in future radio communication systems (for example, 5G), attempting to form an enormous number of beams with digital BF alone might lead to an expensive circuit structure. For this reason, it is more likely that a hybrid BF configuration will be used in 5G.

Figure 3B:
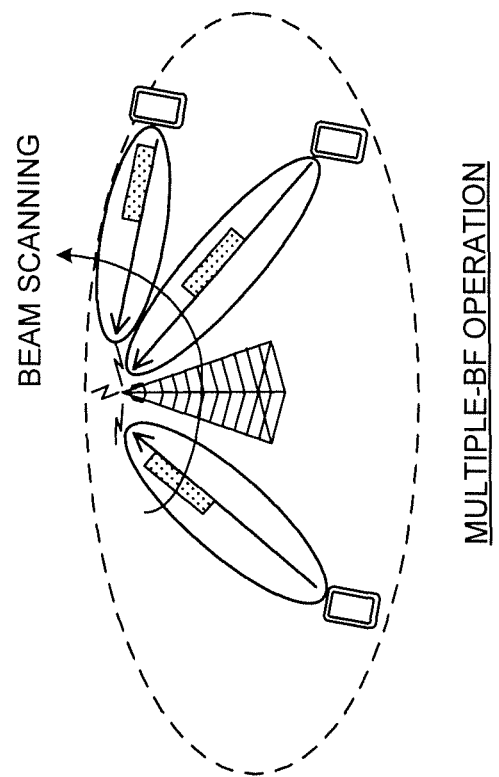
FIG. 3B is a diagram to show an example of multiple BF.
Figure 3A:
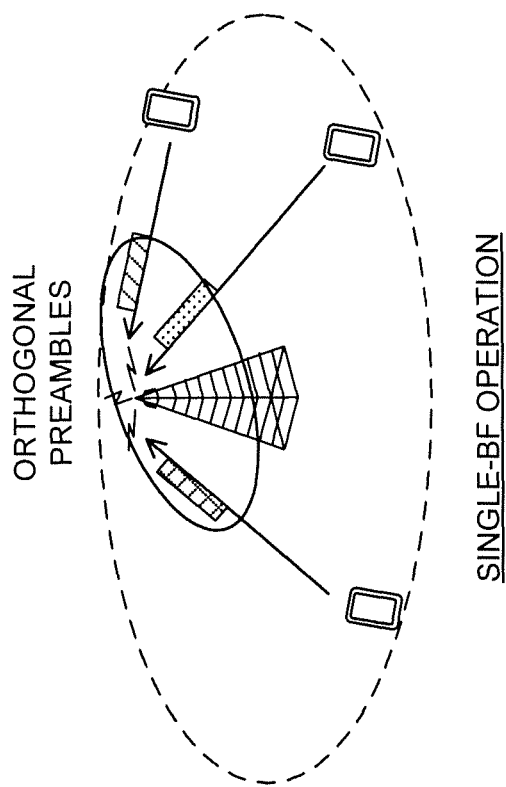
FIG. 3A is a diagram to show an example of single BF.

As for the operation of BF, there are single-BF operation to use one BF, and multiple-BF operation to use multiple BFs (see FIG. 3 and FIG. 4). In UL transmission using single-BF operation, orthogonal preambles are used so that UL beams are orthogonal to each other among a plurality of user terminals (to avoid collisions) (see FIG. 3A and FIG. 4A).

In UL transmission to use multiple-BF operation, BF is applied so that UL beams are orthogonal to each other among a plurality of user terminals (to avoid collisions). For example, transmission may be performed a plurality of times in the time direction by using different beam patterns (by sweeping) (see FIG. 3 and FIGS. 4B and 4C). FIG. 4B shows an example of multiple BF operation in a radio base station (also referred to as an "eNB"), and FIG. 4C shows an example of multiple BF operation in a radio base station and a user terminal.

Now, in existing LTE systems, the radio base station needs to transmit signals for use for cell detection (cell search), initial access and so on (for example, synchronization signals (SSs), the broadcast channel (BCH), system information (SI), etc.), periodically, regardless of whether or not UEs are present.

Figure 5:
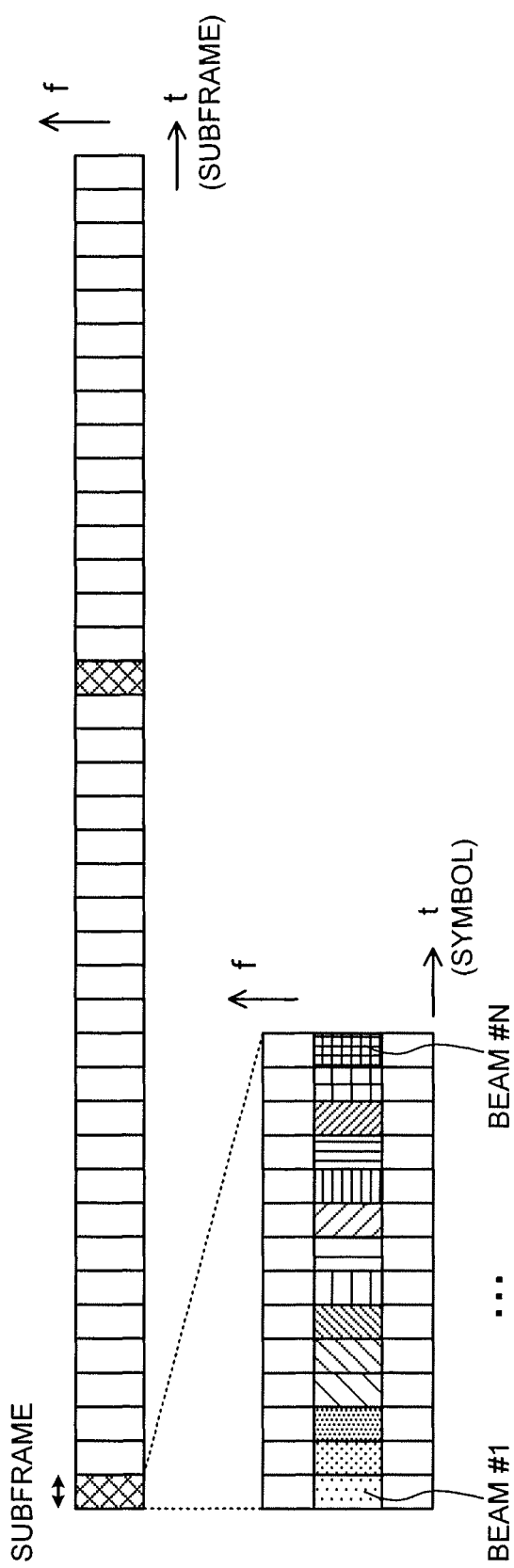
FIG. 5 is a diagram to show a state in which different beam patterns are applied to symbols where synchronization signals are allocated.

To implement enhancement of coverage, it may be possible to transmit all of these signals multiple times by applying different BFs (beam patterns) (that is, by sweeping the signals). FIG. 5 shows a case where synchronization signals, to which varying beam patterns are applied, are allocated to different resources (here, symbols) contained in one subframe. A user terminal performs receiving processes in each symbol, so that the user terminal can receive a signal, to which a beam that is suitable for the terminal is applied, in one of the fourteen symbols. Also, after the user terminal finishes gaining initial access, the radio base station and the user terminal can communicate using appropriate beams (beam patterns to match the synchronization signals received in the user terminal).

When coverage is expanded by applying beamforming to synchronization signals and/or other signals, the same beam (beam pattern) needs to be applied to the paging channel as well, or the paging channel may fail to reach the user terminal. Therefore, it might occur that beamforming is applied to the paging channel as well. However, the radio base station is uncertain which beam patterns are suitable for user terminals in idle mode, and the radio base station may have to apply varying beam patterns to a paging channel, and map and transmit the paging channel in different resources (beam sweeping), as when transmitting synchronization signals.

In this case, if existing paging channel mapping methods and detection methods are adopted, after an existing downlink control channel (PDCCH) has been transmitted a number of times, a downlink shared channel, which transmits paging messages, has to be transmitted a number of times. As a result of this, the user terminal has to detect the paging channel (stay active) for a long period of time, which is likely to lead to increased battery consumption. Also, how to control the operation of the user terminal when the radio base station employs a single beam and employs multiple beams is the problem.

So, where BF is applied to a paging channel, the present inventors have focused on other signals/channels (for example, synchronization signals and/or a broadcast channel) to which BF is applied likewise, and come up with the idea of controlling the allocation (receiving operation) of the paging channel based on the locations where these other signals/channels are allocated (locations where the user terminal detects these signals/channels).

For example, according to one aspect of the present embodiment, when a synchronization signal and/or a broadcast channel are transmitted in a symbol, part of the paging channel (for example, a shared control channel that reports whether or not there is a paging message) is also transmitted in the same symbol. The user terminal performs receiving processes so as to detect the shared control channel in symbols where the synchronization signal is detected.

Also, according to another aspect of the present embodiment, information regarding the method of applying beamforming is reported to the user terminal, and the user terminal controls the method of detecting the paging channel based on the information reported.

Now, embodiments of the present invention will be described in detail below with reference to the accompanying drawings. The radio communication methods according to various embodiments may be implemented separately or may be implemented in combination.

Note that, when, a plurality of beams (beam patterns) are different herein, this should be construed to mean that, for example, at least one of following (1) to (6), applied to each of these multiple beams, is different, but these are by no means limiting: (1) the precoding; (2) the transmission power; (3) the phase rotation; (4) the beam width; (5) the beam angle (for example, the tilt angle); and (6) the number of layers. Note that, when the precoding varies, the precoding weight may vary, or the precoding scheme may vary (for example, linear precoding, non-linear precoding and so on). When linear/non-linear precoding is applied to beams, the transmission power, the phase rotation, the number of layers and so on may also vary.

Examples of linear precoding include precoding based on zero-forcing (ZF) model, precoding based on regularized zero-forcing (R-ZF) model, precoding based on minimum mean square error (MMSE) model and so on. Also, examples of non-linear precoding include dirty paper coding (DPC), vector perturbation (VP), Tomlinson-Harashima precoding (THP) and so on. Note that these are by no means the only types of precoding that are applicable.

(First Aspect) According to a first aspect of the present invention, when a synchronization signal and/or a broadcast channel are transmitted in a symbol, part of a paging channel (for example, a shared control channel that reports whether or not there is a paging message) is transmitted in this same symbol.

Figure 6:
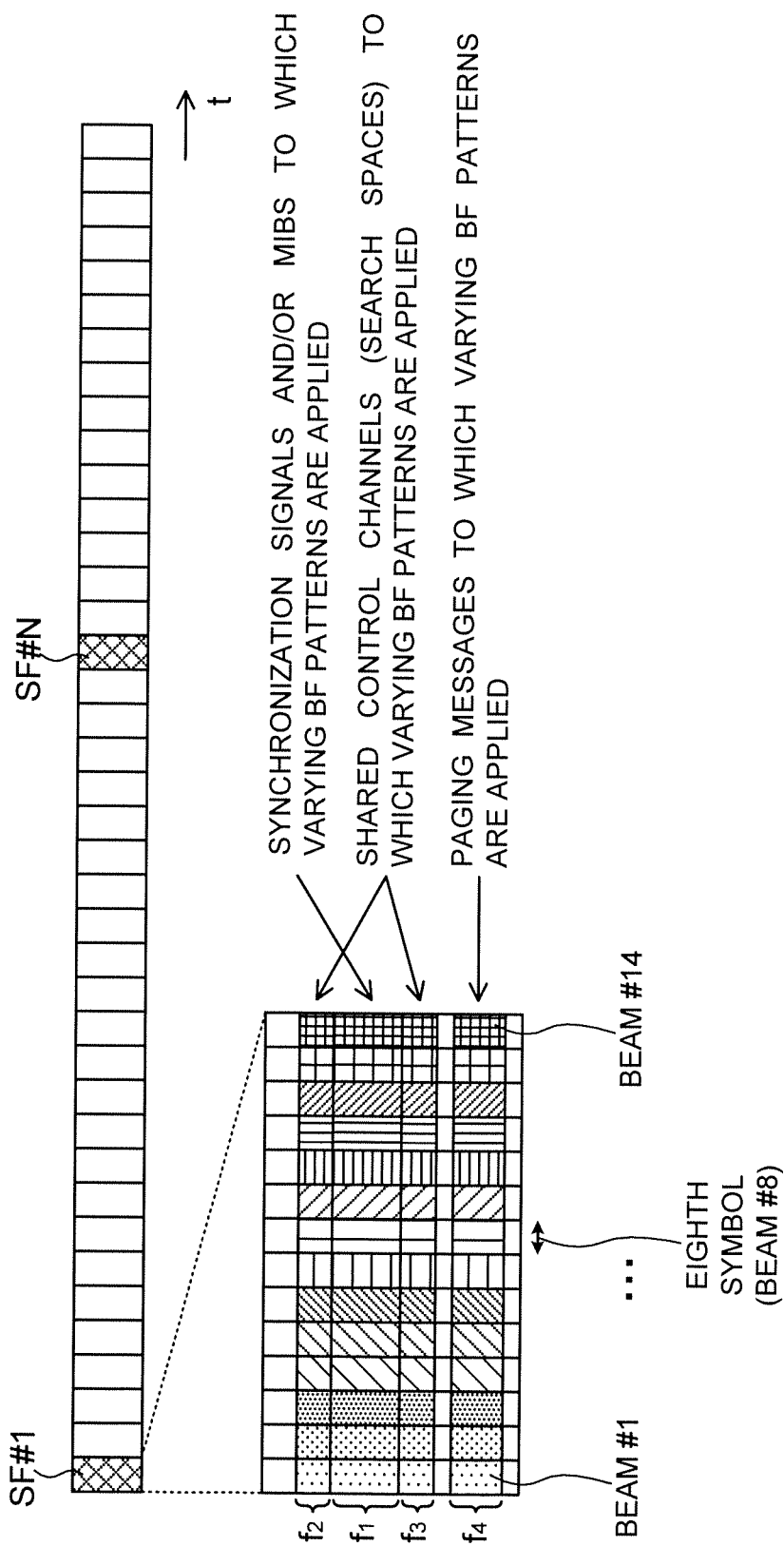
FIG. 6 is a diagram to explain a first aspect of the present invention, in which a shared control channel is detected only in a symbol where a synchronization signal and/or a broadcast channel are detected.

FIG. 6 shows arrangement of resources where varying beamforming patterns are applied on a per symbol basis in a subframe that contains a paging channel. A synchronization signal and/or a broadcast channel, a shared control channel, which reports whether or not there is a paging message (PCH), and a paging message are placed over the same symbol. As shown in FIG. 6, in a radio frame, subframes #1 and #N, in which the paging channel is contained, are transmitted at intervals based on predetermined rules. For example, one subframe is comprised of fourteen symbols. A synchronization signal and/or a broadcast channel, a shared control channel, and a paging message (PCH) are multiplexed on each symbol constituting one subframe, along the frequency direction. In one subframe, the same synchronization signal and/or broadcast channel, shared control channel and paging message (PCH) are transmitted fourteen times, in repetition, in different beamforming patterns.

In each symbol, the synchronization signal and/or the broadcast channel are mapped to frequency resource f1. The broadcast channel is a broadcast channel to which the MIB is allocated. The shared control channel (or the search space of the shared control channel), which reports whether or not there is a paging message, is mapped to frequency resource f2 and/or f3. The shared control channel is, for example, a PDCCH to which P-RNTI-scrambled DCI is mapped. The paging message (PCH) is mapped to frequency resource f4. The paging message (PCH) can be mapped to a physical channel (PDSCH) and transmitted.

According to the first aspect, a synchronization signal and/or a broadcast channel (MIB), a shared control channel that reports whether or not there is a paging message and a paging message (PCH) are mapped to frequency fields in the same symbol. Furthermore, frequency resources f2 and/or f3, where the above shared control channel is mapped, may be allocated within a certain range centered around frequency resource f1 where the synchronization signal and/or the MIB are mapped, or within a predetermined resource range. The range to search frequency resources f2 and f3 for the shared control channel may be determined by the specification based on the frequency resource where the synchronization signal and/or the MIB are mapped (for example, the center frequency), or may be reported via RRC signaling.

To be more specific, different beamforming patterns (beam #1 to beam #14) can be applied to each of the fourteen symbols constituting subframe #1, #N and/or others, which provide POs (see FIG. 6). The radio base station applies different beamforming patterns (beam #1 to beam #14) to each symbol constituting a PO subframe, and repeats transmitting the synchronization signal and/or the MIB and the paging channel (a paging message, and the shared control channel to schedule that paging message), that are multiplexed on each symbol, in different beams.

Under DRX control, a user terminal in idle mode can operate to monitor for the shared control channel, which reports whether or not there is a paging message, only in symbols in which the synchronization signal and/or the broadcast channel are detected. By providing the rule to transmit the shared control channel, which reports whether or not there is a paging message, in the same symbols as those where the synchronization signal and/or the broadcast channel are detected, it becomes possible to detect the shared control channel by simply monitoring the symbols where the synchronization signal and/or the broadcast channel are detected.

To be more specific, now, a user terminal has a receiving section and a control section. The receiving section receives the synchronization signal and/or the broadcast channel and the paging channel that are transmitted in a single beam or in multiple beams. The control section exerts control so that at least part of the paging channel is received in the same subframe as where the synchronization signal and/or the broadcast channel are allocated. As shown in FIG. 6, when signals are transmitted by applying different beamforming patterns (beam #1 to beam #14) to different symbols, the user terminal detects only signals formed by those beams that are directed to that user terminal. In the specific example shown in FIG. 6, only the signals formed by the beamforming pattern applied to the eighth symbol (beam #8) are detected.

The radio base station applies different beamforming patterns to all symbols, and transmits the shared control channel, which reports whether or not there is a paging message, in the same symbols of the same subframe as the synchronization signal and/or the MIB.

In the receiving operation for the synchronization signal and/or the broadcast channel (MIB), the user terminal identifies the radio resource (symbol location and frequency resource) where the synchronization signal and/or the MIB are detected. Then, to detect the paging channel, the user terminal has to monitor only the same symbol (the eighth symbol in FIG. 6) as where the synchronization signal and/or the MIB are detected, and detect the shared control channel in which a paging message is scheduled.

At this time, the user terminal searches the same symbol as where the synchronization signal and/or the MIB are detected, in the frequency direction. By limiting the frequency range (search space) in which the shared control channel may be placed, the burden on the user terminal can be reduced. Accordingly, in the first aspect, resources (search space) for the shared control channel are confined within a certain range centered around the frequency resource allocated to the synchronization signal and/or the MIB (frequency f1 in FIG. 6), or within a predetermined resource range. However, it is not essential to limit the frequency resource to map the shared control channel, which reports whether or not there is a paging message, within a certain range around the frequency resource to which the synchronization signal is mapped.

The user terminal detects the shared control channel by searching the same symbol as where the synchronization signal and/or the MIB are detected, in the frequency direction, and detects whether or not there is a paging message, from the shared control channel. Then, if there is an explicit indication that a paging message has been sent, the user terminal acquires the paging message from frequency resource f4, in the same symbol as where the synchronization signal and/or the MIB are detected (the eighth symbol in FIG. 6). Frequency resource f4 of the paging message may be specified by the shared control channel.

Thus, according to the first aspect, the user terminal in idle mode can receive the shared control channel by only monitoring frequency fields in the same symbol resource as determined based on the detection result of the synchronization signal and/or the MIB. Consequently, it is not even necessary to search all the symbols (all beams) in a subframe in which the paging channel is accommodated, to detect the shared control channel, so that reduced battery consumption can be achieved.

Also, according to the first aspect, frequency resources where the shared control channel, which reports whether or not there is a paging message, may be mapped are confined within a certain range centered around the frequency resource to which the synchronization signal and/or the MIB are mapped, or within a predetermined resource range, so that it is not even necessary to monitor the entire band to search for the shared control channel, thereby achieving reduced battery consumption. Also, even when it is necessary to transmit the synchronization signal and the shared control channel in frequency resources at and off the center, it is only necessary to search a predetermined range centered around the frequency resource to which the synchronization signal is mapped, which also makes it possible to reduce the battery consumption.

(Second Aspect)

In a second aspect of the present invention, the paging channel is not transmitted in all subframes in which the synchronization signal and/or the broadcast channel (MIB) are placed, but is transmitted only in part of these subframes.

The radio base station maintains the rule of mapping the paging channel to the same symbols as where the synchronization signal and/or the MIB are mapped, as in the above-described first aspect, and, in addition to this, the radio base station configures the density of subframes that transmit the paging channel lower than the density of subframes that transmit the synchronization signal and/or the MIB. By this means, in part of the subframes containing the synchronization signal and/or the MIB, the paging channel is not mapped to the same symbols as where the synchronization signal is placed, so that a margin is produced in capacity.

To be more specific, the radio base station transmits subframes that contain the synchronization signal and/or the MIB in a first cycle (for example, a cycle of five subframes), which is based on a predetermined rule, and transmits subframes that contain the paging channel in a second cycle (for example, a cycle of ten subframes), which is longer than the first cycle. At this time, the intervals of these subframes are controlled so that the synchronization signal and/or the MIB are always placed in subframes in which the paging channel is present. A subframe that transmits the paging channel can be specified from the system frame number (SFN) and the subframe index. Looking at a subframe in which the paging channel is contained, a synchronization signal and/or a broadcast channel, a shared control channel and a paging message (PCH) are frequency-multiplexed over each symbol constituting that one subframe (as in FIG. 6).

A user terminal in idle mode detects the synchronization signal and/or the MIB in a predetermined cycle based on the DRX cycle. The user terminal receives the paging channel in a subframe to provide a PO, which is specified from the system frame number (SFN) and the subframe index. As shown in FIG. 6, when different beamforming patterns (beam #1 to beam #14) are applied to each symbol constituting one subframe, the user terminal detects only signals that are formed by beams directed to that user terminal (beam #8 in FIG. 6).

If a subframe contains the paging channel, a user terminal in idle mode can receive signals (the eighth symbol) that are formed by beams directed to this user terminal (for example, beam #8). When performing the receiving operation for this paging channel-containing subframe, the control section of the user terminal detects the synchronization signal and/or the MIB from frequency resource f1 on the eighth symbol, and searches for the shared control channel, which reports whether or not there is a paging message, in the resource that is determined based on the detection result (the same symbol: the eighth symbol). As in the first aspect, frequency resources where the shared control channel, which reports whether or not there is a paging message, can be mapped may be kept within a predetermined range centered around the frequency resource to which the synchronization signal and/or the MIB are mapped, or such a range may not be necessary.

Thus, according to the second aspect, in part of the subframes in which the synchronization signal and/or the MIB are contained, the paging channel is not mapped to the same symbol as where the synchronization signal is placed, so that a margin is produced in capacity, and, for example, system information other than the MIB can be transmitted instead of the paging channel.

(Third Aspect)

In a third aspect of the present invention, while the paging channel is transmitted in subframes other than subframes that contain the synchronization signal and/or the MIB, these varying subframes match up the symbol (symbol index) where the synchronization signal and/or the MIB are allocated, and the symbol (symbol index) where (at least part of) the paging channel is allocated. Note that, where there are a subframe containing the synchronization signal and/or the MIB and a subframe containing the paging channel, the same beamforming pattern is applied to the symbols of the same symbol index.

Figure 7:
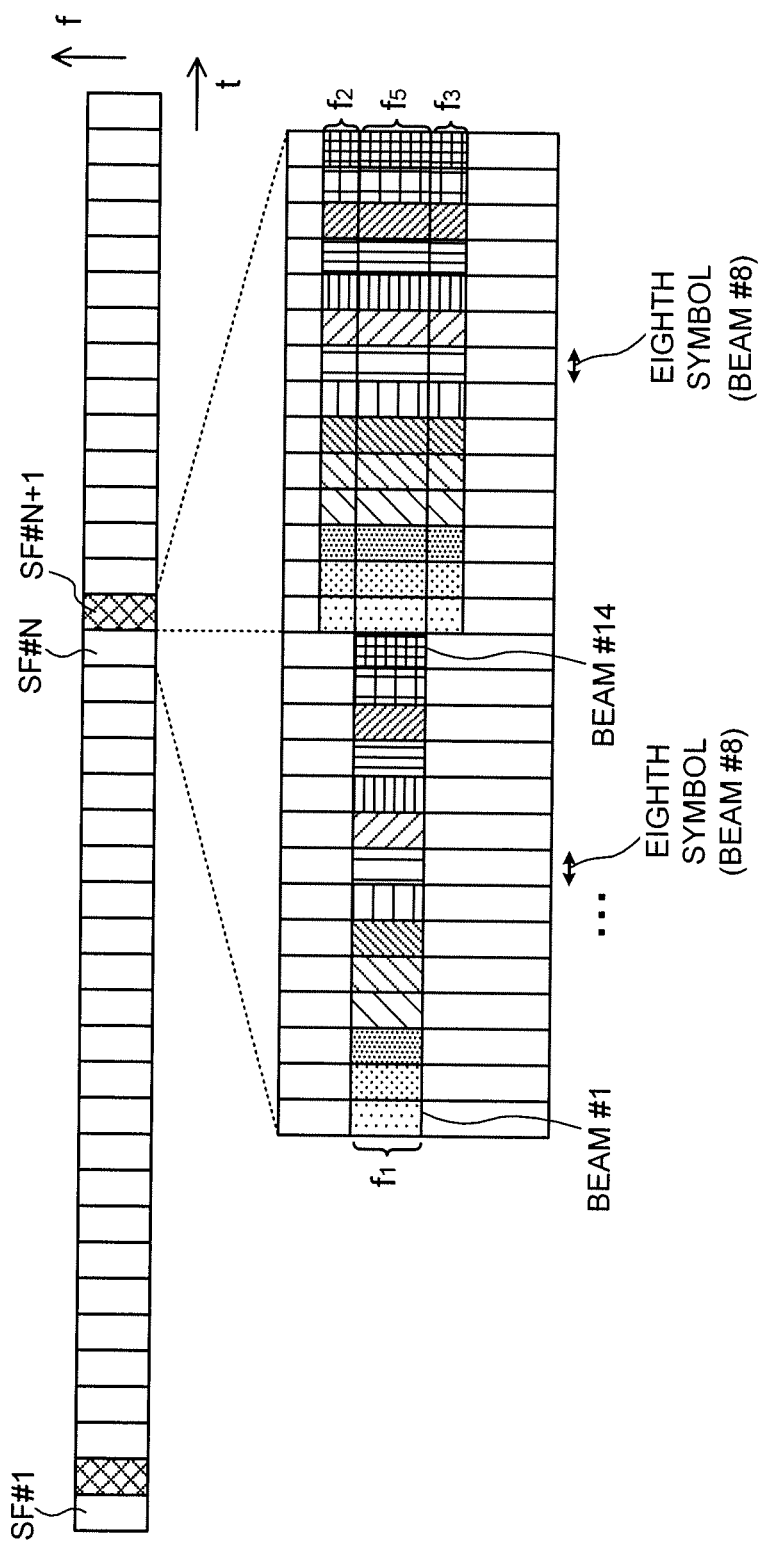
FIG. 7 is a diagram to show arrangement of resources according to a third aspect of the present invention.

The resource arrangement shown in FIG. 7 is an example of resource arrangement where the paging channel is not placed in subframe #N, which contains the synchronization signal and/or the MIB, but is placed in another subframe #N+1, which contains no synchronization signal and/or MIB. In subframe #N, different beamforming patterns (beam #1 to beam #14) are applied to the synchronization signal and/or the MIB between different symbols. Furthermore, in subframe #N+1, which contains the paging channel but does not contain the synchronization signal and/or the MIB, different beamforming patterns (beam #1 to beam #14) are applied to the paging channel between different symbols. In subframe #N, which contains the synchronization signal and/or the MIB, and subframe #N+1, which contains the paging channel, the same beamforming pattern is applied to the same symbol index.

In each subframe (for example, SF #N in FIG. 7) that contains the synchronization signal and/or the MIB, the radio base station maps the synchronization signal and/or the MIB to frequency resource f1 on each symbol, but does not map the paging channel to the same symbol or to the other symbols in that subframe. Meanwhile, if a subframe (for example, SF #N+1 in FIG. 7) contains the paging channel, the radio base station allocates the shared control channel, which reports whether or not there is a paging message, over the symbol of the same symbol index as that of the above-symbol where the synchronization signal and/or the MIB are mapped, and, furthermore, allocates a paging message (PCH) over this symbol.

In each subframe containing the synchronization signal and/or the MIB (SF #N), the radio base station transmits symbols by applying different beamforming patterns (beam #1 to beam #14), and, even when subframes contain the paging channel (SF #N+1), the radio base station transmits symbols by applying different beam forming patterns (beam #1 to beam #14).

The user terminal, in idle mode, tries to detect the synchronization signal and/or the paging channel in a predetermined cycle based on the DRX cycle. At certain timing, the receiving section of the user terminal may receive a subframe containing the synchronization signal and/or the MIB, and, at another timing, such as the timing of a PO, which is specified from the system frame number (SFN) and the subframe index, receives a subframe that contains the paging channel. When performing the receiving operation for a subframe containing the synchronization signal and/or the MIB, the control section of the user terminal detects only those signals that are formed by beams directed to that user terminal (for example, beam #8 shown in FIG. 7). In a subframe containing the synchronization signal and/or the MIB (SF #N), the user terminal receives, for example, signals formed by beam #8 (the eighth symbol), and detects the synchronization signal and/or the MIB from frequency resource f1 in the eighth symbol. The control section holds the symbol index and frequency resource of this symbol where the synchronization signal and/or the MIB are detected.

Meanwhile, in the receiving operation for a subframe containing the paging channel (SF #N+1), the control section of the user terminal receives signals formed by beam #8 (the eighth symbol), for example, and searches for the shared control channel, which reports whether or not there is a paging message, in the symbol having the same symbol index as that of the symbol in which the synchronization signal and/or the MIB are detected. Frequency resources to which the shared control channels may be allocated might stay in a predetermined range centered around the frequency resource to which the synchronization signal and/or the MIB are mapped, as in the first aspect, or such a range may not be necessary. The shared control channel that reports whether or not there is a paging message is mapped to the symbol of the same index as that of the synchronization signal and/or the MIB, so that the user terminal can detect the shared control channel that reports whether or not there is a paging message, without even searching all the other symbols. The control section of the user terminal detects whether or not there is a paging message from the shared control channel, if there is information indicating that a paging message is present, the control section of the user terminal acquires the paging message from the frequency resource to which the paging message is mapped, based on the shared control channel information, in the same symbol as where the shared control channel is allocated.

According to the third aspect, it is possible to transmit the paging channel in subframes other than subframes containing the synchronization signal and/or the MIB, so that the method of transmitting the paging channel can be made more flexible.

(Fourth Aspect)

A fourth aspect of the present invention makes it possible to transmit a paging message (PCH) and a shared control channel to schedule this paging message in different symbols or in different subframes. The association between the shared control channel that schedules a paging message and the symbol in which the synchronization signal and/or the MIB are detected is the same as in the first to third aspects.

In the first to third aspects, examples have been described in which a paging message (PCH), which constitutes a paging channel, and a shared control channel, which schedules this paging message (a channel that reports whether or not there is a paging message), are allocated to the same symbol in the same subframe. The fourth aspect provides a paging message (PCH) and the shared control channel that schedules this paging message in the following patterns of associations:

(1) The pattern in which a paging message and the shared control channel that schedules this paging message are allocated to the same symbol in the same subframe (the pattern described in the first to third aspects).

(2) The pattern in which a paging message and the shared control channel that schedules this paging message are allocated to different symbols in the same subframe. In the event different beamforming patterns are applied to all symbols in one subframe, as shown in FIG. 6, unless the paging message and the shared control channel are allocated to adjacent symbols or nearby symbols, a user terminal might fail to detect one symbol. Therefore, when allocating a paging message (PCH) and a shared control channel to schedule the paging message are allocated to separate symbols, these symbols are preferably adjacent symbols or nearby symbols. Also, when the same beamforming pattern is applied to different symbols in one subframe, a paging message (PCH) and a shared control channel that schedules the paging message are allocated to symbols that are different symbols but that use the same beamforming pattern.

(3) The pattern in which a paging message and the shared control channel that schedules this paging message are allocated to symbols of the same symbol index in different subframes. In this case, assume that the same beamforming pattern is applied to the same symbol index in the subframe where the paging message (PCH) is allocated and the subframe where the shared control channel scheduling the paging message is allocated.

(4) The pattern in which a paging message and the shared control channel that schedules this paging message are allocated to symbols of different symbol indices in different subframes. In this case, PO/PF indicates the subframe of the shared control channel. By providing an indication in the shared control channel, the paging message (PCH) can be placed in an arbitrary subframe. Also, at this time, the paging message (PCH) may be placed in different subframes per beam pattern, and the paging message (PCH) does not need to be mapped to one symbol, and may be mapped across multiple symbols just like any other PDSCH.

(5) The pattern in which a synchronization signal and/or the MIB, and a shared control channel are allocated to different subframes, and in which, furthermore, a paging message (PCH) and the shared control channel are also allocated to different subframes.

Figure 8:
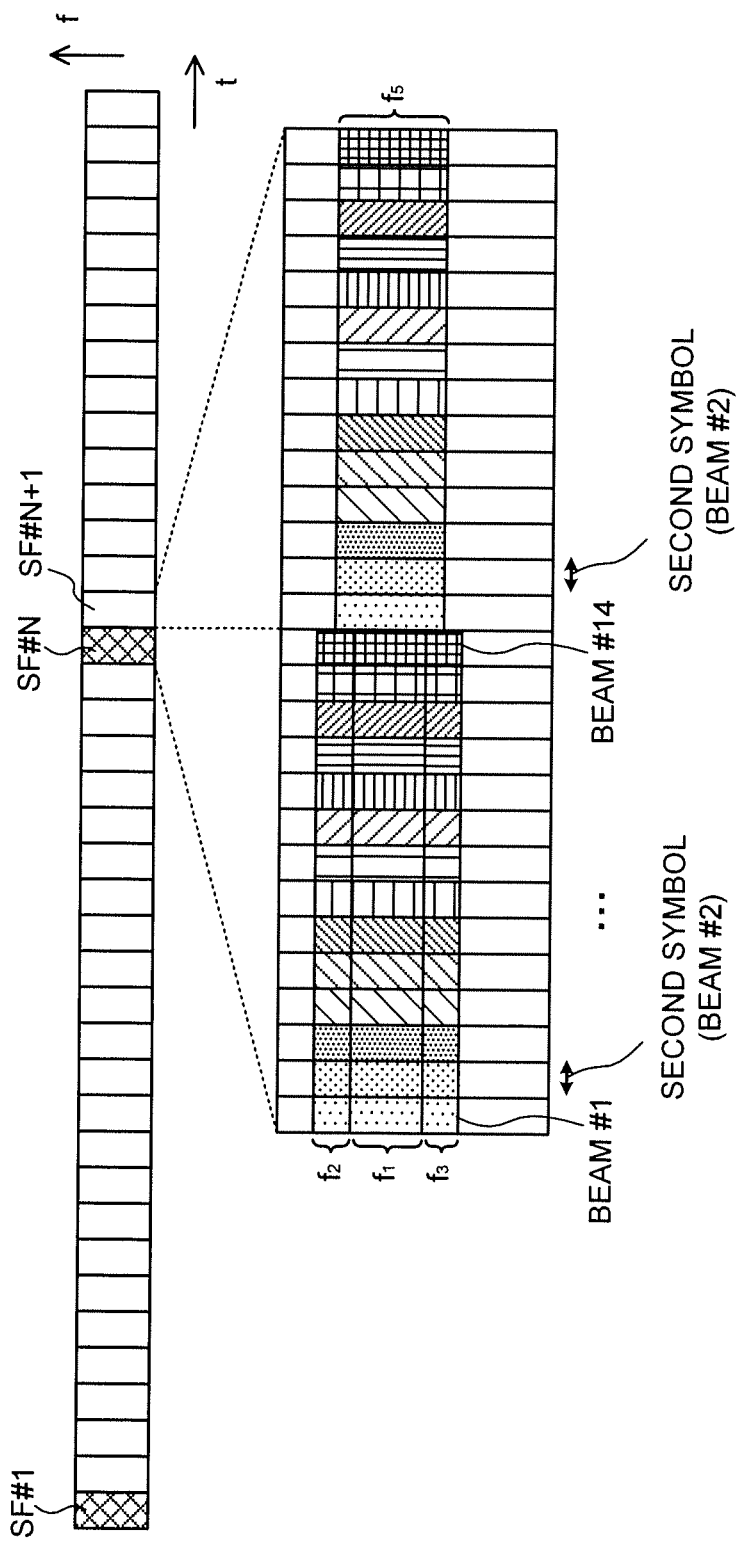
FIG. 8 is a diagram to explain a fourth aspect of the invention for transmitting a paging message and a shared control channel in separate subframes.

FIG. 8 is a diagram to show a specific example of above pattern (3). In subframe #N, a shared control channel that schedules a paging message is transmitted, and, in another subframe #N+1, the paging message scheduled by the shared control channel (transmitted in subframe #N) is transmitted. Different beamforming patterns (beam #1 to beam #14) are applied to every symbol in subframes #N and #N+1, the same beamforming pattern (for example, beam #2 is applied to the second symbol) is applied to the same symbol index (for example, symbol index #2 of the second symbol).

In subframe #N, the paging message-scheduling shared control channel is mapped to the same symbol (the second symbol) as where the synchronization signal and/or the MIB are mapped. The synchronization signal and/or the MIB are mapped to frequency resource f1, and the shared control channel is mapped to different frequency resources f2 and/or f3 in the same symbol, but no paging message is mapped to subframe #N.

In subframe #N+1, the paging message (PCH) is mapped to frequency resource f5 in each symbol. This paging message is part of the paging channel scheduled by the shared control channel transmitted in subframe #N.

The user terminal performs the following receiving operation for subframe #N and subframe #N+1, which are received at different timings. The receiving section of the user terminal receives only those signals that are formed by beams directed to this user terminal (beam #2 in FIG. 8) in the receiving operation for subframe #N. The receiving section of the user terminal receives the signals formed in beam #2 (second symbol), for example, and the control section of the user terminal detects the synchronization signal and/or the MIB from frequency resource f1 in the second symbol. Furthermore, the receiving section of the user terminal detects the shared control channel that reports whether or not there is a paging message, from the same symbol as where the synchronization signal and/or the MIB are detected, and acquires paging message scheduling information. Here, a case where information to indicate that there is a paging message is acquired will be described below.

During the receiving operation for subframe #N+1, the receiving section of the user terminal detects the signals formed by beams directed to this user terminal (beam #2 of FIG. 8), as in subframe #N. The receiving section of the user terminal receives the signals formed by beam #2 (second symbol). The control section of the user terminal searches frequency resource f5 in the second symbol where the symbol index is the same as in the symbol in which the synchronization signal and/or the MIB are detected, and detects the paging message.

(Fifth Aspect)

A fifth aspect of the present invention allows different user terminals to go to different resources (subframes or slots) to read paging messages. This will reduce the size of each paging message and increase the capacity of paging.

According to the first aspect to the fourth aspect, the same paging message is transmitted by switching beams in different resources. It then follows that, the resources that are used to transmit paging messages tend to increase. For example, while the first aspect described above with reference to FIG. 6 has focused on a paging channel addressed to one user terminal, there is a possibility that paging messages (PCHs) for a plurality of user terminals are multiplexed in subframe #1 containing the paging channel. In this case, paging messages for a plurality of user terminals are multiplexed on symbols in subframe #1.

The fifth aspect distributes paging messages addressed to multiple user terminals in the time direction (subframes or slots) and/or in the frequency direction so as to control the user terminals to go to different resources (subframes or slots) to read paging messages. By this means, the resources (subframes or slots) where multiple user terminals go to read paging messages are distributed, so that the size of paging messages multiplexed over one symbol can be reduced.

The radio base station transmits synchronization signals and/or broadcast channels (MIBs) to a plurality of user terminals in the same manner as in the first aspect to the fourth aspect. For example, as in the first aspect, a synchronization signal and/or the MIB are transmitted in every symbol of subframe #1, by applying different beamforming patterns (beam #1 to beam #14) per symbol. The resources in which at least part of the paging channel (a paging message and the shared control channel to schedule that paging message) are transmitted are distributed in the time direction (subframe or slot) and/or the frequency direction so that the user terminals do not overlap or the number of users to be multiplexed becomes smaller.

Figure 9A:
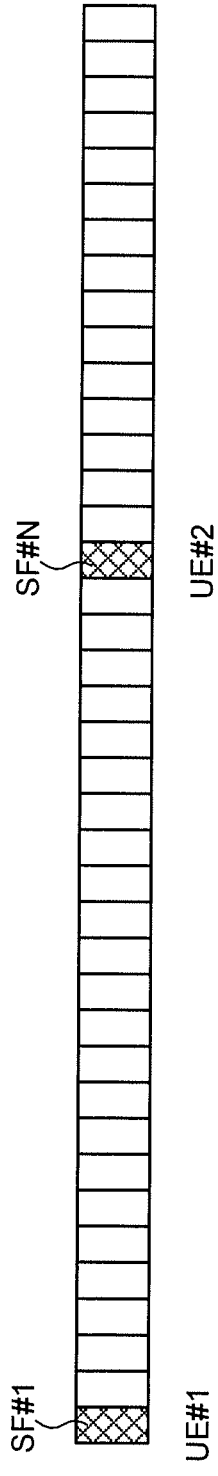
FIG. 9A is a diagram to show arrangement of resources, where paging channels for different user terminals are distributed in the time direction (subframes)

To be more specific, PFs and POs are determined in association with each user terminal's UE-ID and subframes to contain paging channels are identified, so that subframes (user terminals) to transmit paging channels can be distributed. Note that the same beamforming pattern is applied to each symbol in a subframe that transmits the paging channel as in a subframe containing the synchronization signal and/or the MIB. As a result of this, as shown in FIG. 9A, in subframe #1 that transmits a paging channel, only the paging channel for user terminal #1 is transmitted, and, in subframe #N where a paging channel is transmitted next, only the paging channel for different user terminal #2 is transmitted.

User terminal #1 receives a subframe in which a synchronization signal and/or the MIB are contained, from the beam directed to user terminal #1. Then, the synchronization signal and/or the MIB are detected from one symbol in the received subframe. The symbol in which the synchronization signal and/or the MIB are detected is retained and used to search for the paging channel, which is transmitted in another subframe. User terminal #1 calculates the PF and the PO based on its own UE-ID, and identifies the subframe that contains the paging channel allocated to user terminal #1, from that calculation result (for example, subframe #1).

User terminal #1 receives subframe #1 as a paging channel-transmitting subframe. The control section of user terminal #1 detects a shared control channel, which reports whether or not there is a paging message, from the same symbol as where the synchronization signal and/or the MIB were detected in the previously received subframe. The control section of user terminal #1 detects the shared control channel in the same way as the synchronization signal, on assumption that the same beamforming pattern is applied to the same symbol index. Furthermore, in the event a paging message is present, the paging message is detected from a frequency resource in the same symbol based on the information of the shared control channel.

This limits the size of paging message that can be multiplexed over one symbol, so that the users to be multiplexed over one symbol are distributed based on UE-IDs, and the capacity of paging can be increased.

Figure 9C:
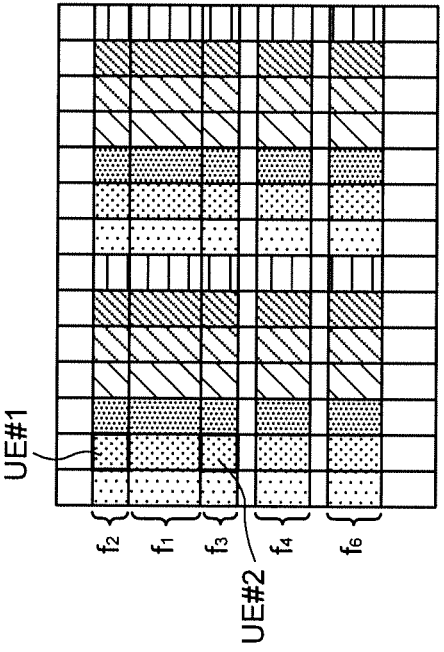
FIG. 9C is a diagram to show arrangement of resources, where paging channels for different user terminals are distributed in the frequency direction.
Figure 9B:
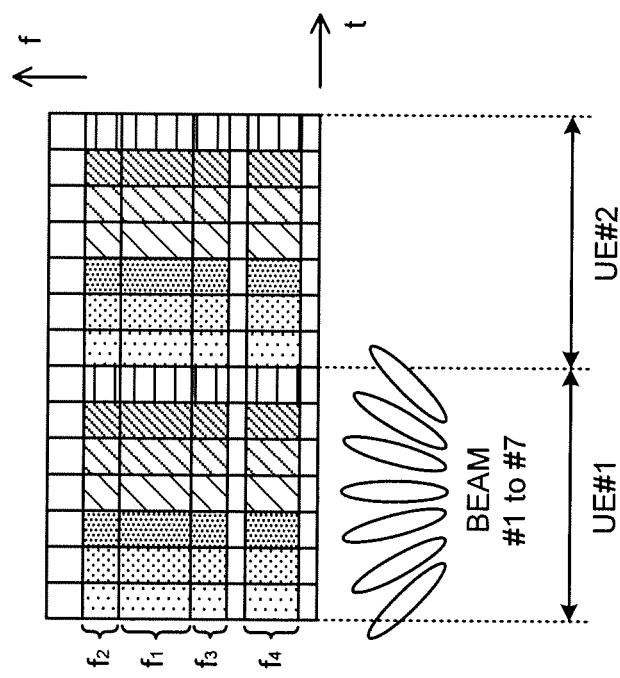
FIG. 9B is a diagram to show arrangement of resources, where paging channels for different user terminals are distributed in the time direction (slots)

Although, in FIG. 9A, paging channels that are addressed to a plurality of user terminals are distributed over a plurality of subframes #1 and #N, it is equally possible to distribute users among slots in one subframe, as illustrated in FIG. 9B.

The radio base station applies the same beam pattern set to the first-half slot and the second-half slot. The radio base station applies different beamforming patterns (beam #1 to beam #7) to the seven symbols constituting the first-half slot, and applies beamforming patterns (beam #1 to beam #7), that are the same beam pattern set as that applied to the first-half slot, to the seven symbols making up the second-half slot. The radio base station also applies the same beam pattern set (beam #1 to beam #7) to the first-half slot and the second-half slot even in paging channel-transmitting subframes, as described above.

The user terminal receives beam addressed to that user terminal in the first-half slot and the second-half slot, and receives the subframe containing a synchronization signal and/or the MIB. Then, the user terminal detects the synchronization signal and/or the MIB from one symbol in the received subframe. The MIB may carry information related to the allocation of slots in the paging channel provided by the radio base station. User terminal #1 calculates the PF and PO based on its own UE-ID, and, based on this calculation result, identifies subframe #1 as a subframe to transmit the paging channel allocated to user terminal #1.

Furthermore, the user terminal determines in which one of the first-half slot and the second-half slot the paging channel for that user terminal is mapped, from the information contained in the MIB. User terminal #1 detects the shared control channel, which reports whether or not there is a paging message, from the same symbol as where the synchronization signal and/or the MIB were detected in the previously received subframe. Assuming that the same beamforming pattern is applied to the same symbol index, the shared control channel can be detected in the same way as the synchronization signal. Furthermore, in the event a paging message is present, the paging message is detected from a frequency resource in the same symbol based on the information of the shared control channel.

Note that, although, in the above description, different user terminals are distributed in the time direction (subframes, slots), these user terminals can go to different resources associated with the UE-IDs, in the frequency direction, to read shared control channels or paging messages (PCHs). For example, as shown in FIG. 9C, a paging channel for user terminal #2, which is different from user terminal #1, is mapped to second symbol #2 where the synchronization signal and/or the MIB are mapped.

User terminal #1 exerts control so that frequency resource f2, where the control channel is allocated, is calculated from its own UE-ID, and another user terminal #2 exerts control so that frequency resource f3 where the control channel is allocated is calculated from its own UE-ID. User terminal #1 can receive the paging message of f4 based on the downlink control information detected in f2, and user terminal #2 can receive the paging message of f6 based on the downlink control information detected in f3. The user distribution in the time direction and the user distribution in the frequency direction may be combined or dynamically switched.

(Sixth Aspect)

A sixth aspect of the present invention provides a mechanism for allowing user terminals to read paging messages (PCHs) directly, without using a shared control channel that reports paging message and resources. The relative location of the resource to allocate a paging message (PCH), with respect to a synchronization signal and/or the MIB, may be fixed by the specification, or may be indicated to the user terminal using the synchronization signal and/or the MIB and so on. Furthermore, it is also possible to adopt a configuration that allows different user terminals to assume different PCH resource locations (resources to which paging messages are allocated) in association with UE-IDs and so on.

Figure 10B:
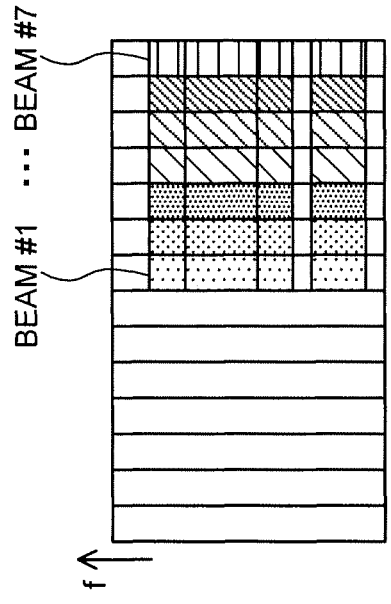
FIGS. 10B and 10C are diagrams to show arrangement of paging channel resources supporting seven beams.
Figure 10D:
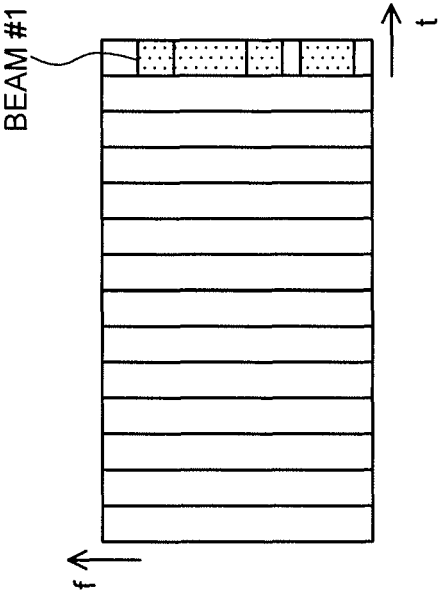
FIG. 10D is a diagram to show arrangement of paging channel resources supporting one beam.
Figure 10A:
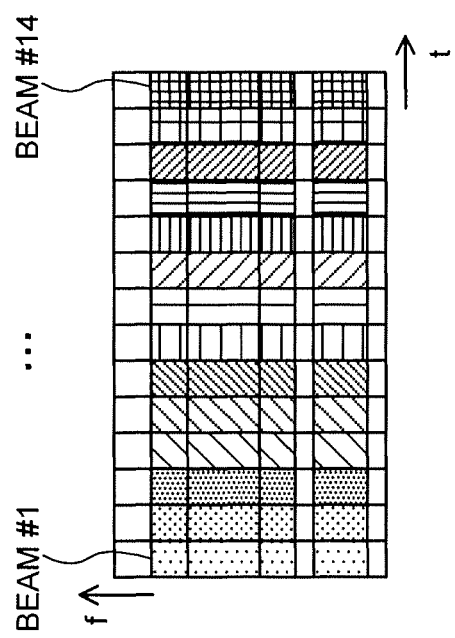
FIG. 10A is a diagram to show arrangement of paging channel resources supporting fourteen or more beams.
Figure 10C:
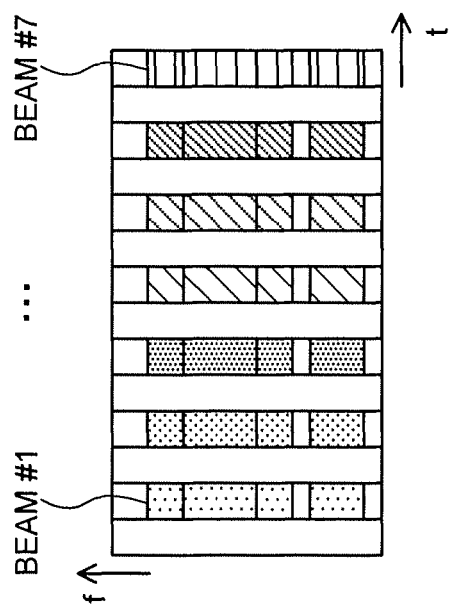

As explained above, the first aspect to the sixth aspect incorporate the concept that the resource for monitoring for the paging channel is determined based on the detection result of the synchronization signal and/or the broadcast channel. This concept can be applied regardless of the number of beams, so that various numbers of beams such as those illustrated in the examples of FIGS. 10A, 10B, 10C and 10D are possible. FIG. 10A shows a case where there are fourteen or more beams, and FIGS. 10B and 10C show cases where there are seven or more beams. FIG. 10D shows a case with one beam.

(Seventh Aspect)

According to a seventh aspect of the present invention, a radio base station reports the method of beamforming to a user terminal. For example, the radio base station reports a multi-beam approach or a single-beam approach to a user terminal, in the MIB or in a shared control channel containing system information that is equivalent to the MIB, and the user terminal changes the method of detecting the paging channel based on that information. To be more specific, when the radio base station reports the method of beamforming to a user terminal, the radio base station may report the number of beams or report an index that corresponds to the approach to be applied, from among multiple predefined approaches.

Although the procedures described in the first aspect to the sixth aspect can be applied as procedures common to both the multi-beam approach and the single-beam approach, in the case of the single-beam approach, only one symbol is in fact used to transmit the synchronization signal, so that, for example, a paging message (PCH) may be sent in another symbol (the same frequency field) in the subframe containing the synchronization signal. This makes it possible to make DRX more efficient than when sending a paging message (PCH) in a subframe different from that of the synchronization signal.

In the case of the single-beam approach, more efficient paging operation is possible. So, which approach is adopted is reported via system information to the user terminal, and the user terminal changes the paging receiving operation accordingly. For example, in the case of the single-beam approach, as shown in FIG. 11, the resource location of a shared control channel that schedules a paging message (PCH) is changed from the resource location used in the multi-beam approach.

Figure 11:
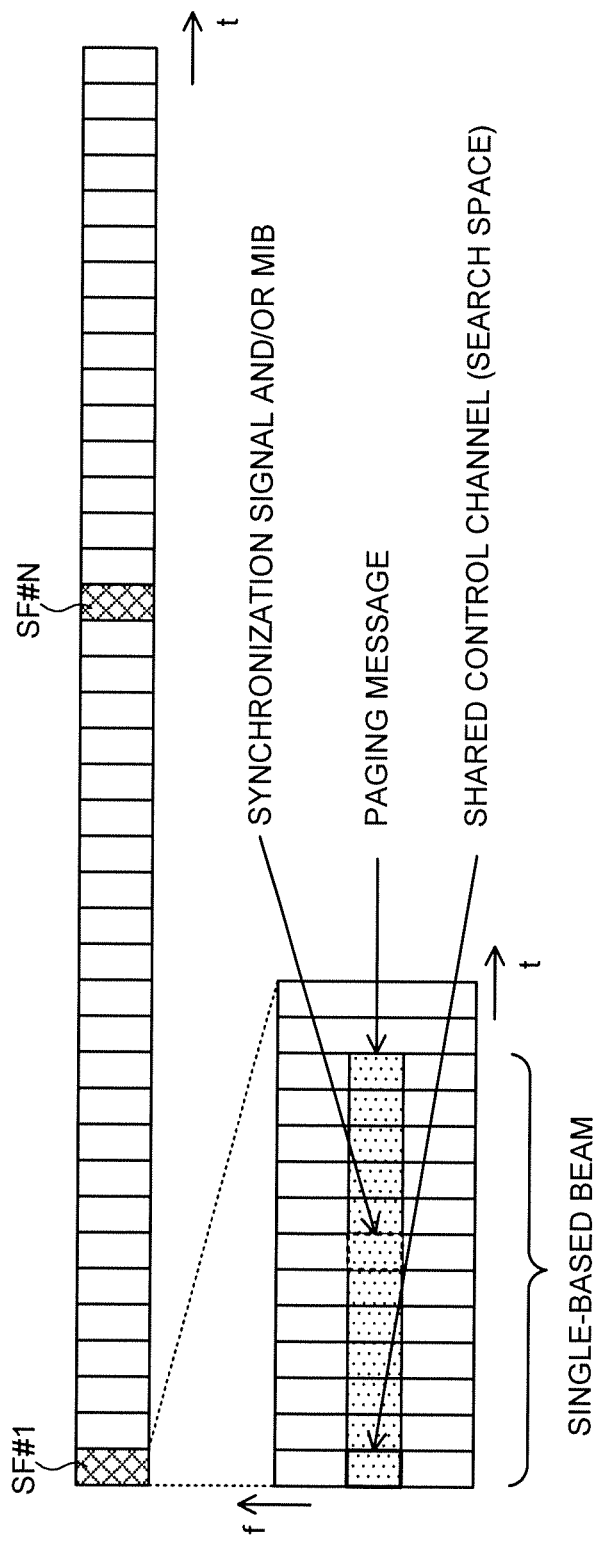
FIG. 11 is a diagram to show arrangement of paging channel resources in the event a single-beam approach is used.

As shown in FIG. 11, in the case of the single-beam approach, a shared control channel's search space, which contains system information that is equivalent to the MIB, is placed in the first symbol of a subframe that contains paging messages, and a synchronization signal and/or the MIB are mapped to a symbol (for example, the seventh symbol) behind this shared control channel. Then, the paging messages (PCHs) are mapped to symbol timings apart from the receiving timing of the synchronization signal and/or the MIB (for example, the second symbol to the sixth symbol, or the eighth symbol to the twelfth symbol).

In this example, paging messages (PCHs) can be mapped to multiple symbols. The frequency resources where the shared control information channel and the paging messages (PCHs) are mapped occupy the same field as the frequency resource where the synchronization signal and/or the MIB are mapped.

The radio base station specifies the multi-beam approach or the single-beam approach in the MIB or in a shared control channel containing system information that is equivalent to the MIB. For example, when the single-beam approach is designated, as shown in FIG. 11, information to indicate that the single-beam approach is adopted is placed in the MIB or in the shared control channel that contain system information equivalent to the MIB, which is transmitted in a symbol in the first-half of the subframe (the first symbol in the example shown in FIG. 11). Then, the radio base station transmits the MIB (or the shared control channel containing system information that is equivalent to the MIB), the synchronization signal and/or the MIB, and the paging message (PCH) in the resource arrangement shown in FIG. 11, which is a format suitable for the single-beam approach. On the other hand, if the multi-beam approach is designated, information to indicate that the multi-beam approach is used is placed in the MIB or in a shared control channel containing system information that is equivalent to the MIB. Then, the radio base station uses the paging channel transmission method (resource arrangement) based on one of the first aspect to the sixth aspect described above, as a format suitable for the multi-beam approach, and transmits the MIB (or the shared control channel containing system information that is equivalent to the MIB), the synchronization signal and/or the MIB, and the paging message (PCH).

In the event the single-beam approach is designated, the user terminal detects the MIB or the shared control channel that contains system information equivalent to the MIB, in the first symbol of the subframe shown in FIG. 11 and recognizes that the single-beam approach is adopted, and performs the paging channel receiving operation for the single-beam approach. In the resource arrangement shown in FIG. 11, the user terminal detects the synchronization signal and/or the MIB in the seventh symbol, and detects the paging message (PCH) mapped to a symbol apart from the symbol in which the synchronization signal is detected. The symbol location where the paging message (PCH) is allocated may be reported in information contained in the MIB.

On the other hand, in the event the multi-beam approach is designated, the user terminal performs the receiving operation based on one of the first aspect to the sixth aspect. That is, the user terminal receives a subframe containing a synchronization signal and/or the MIB from the beam directed to the user terminal. Then, the user terminal detects the synchronization signal and/or the MIB from one symbol in the received subframe. The user terminal determines the resource for monitoring for the paging channel based on the detection result of the synchronization signal and/or the MIB, and searches for paging channel information.

As described above, the user terminal changes the method of monitoring the paging channel depending on whether the multi-beam approach or the single-beam approach is reported in the MIB or in a shared control channel containing system information that is equivalent to the MIB. FIGS. 12A, 12B, 12C and 12D show paging channel monitoring methods corresponding to varying numbers of beams.

FIG. 12A shows the paging channel monitoring method for use when the single-beam approach is employed, as described earlier with reference to FIG. 11. FIG. 12B shows an example of applying the first beam (beam #1) to the first-half slot of a subframe that contains the paging channel, and applying a second beam (beam #2) to the second-half slot. The approach/method is reported by placing the MIB or the shared control channel that contains system information equivalent to the MIB, in the first symbol of the first slot and the first symbol of the second-half slot, and the synchronization signal and/or the MIB are placed in the last symbol of the first-half slot and the last symbol of the second-half slot. This paging channel monitoring method assumes a resource arrangement in which paging messages are placed in intermediate symbols in the first-half slot and intermediate symbols in the second-half slot.

FIG. 12C shows an example of applying seven beams (beam #1 to beam #7) so that beams vary every two symbols. This paging channel monitoring method assumes a resource arrangement where, between two symbol sets, the MIB or the shared control channel that contains system information equivalent to the MIB is placed in the first set of symbols (the first-half symbols) to report the approach/method, and the synchronization signal and/or the MIB, as well as paging messages, are placed in the last set of symbols (the second-half symbols).

FIG. 12D shows the paging channel monitoring method for use when the multi-beam approach is designated, showing a paging channel monitoring method assuming the resource arrangement described with reference to FIG. 6 in the first aspect.

Now, paging messages (PCHs) and shared control channels to schedule these are read only by accommodating UEs (5G standalone). Standardization is in progress to standardize 5G non-standalone UEs as well (on the premise that these are LTE-assisted), and it is desirable that such UEs can operate, without being affected, even in subframes that contain paging messages (PCHs) and/or the shared control channels to schedule them. Resources may be allocated by avoiding paging messages (PCHs) and/or the shared control channels to schedule them, when it is desirable to allocate a prolonged wideband, it is necessary to send a command to avoid resources overlapping with paging messages (PCHs) and/or the like. Trying to send such commands by using DCI makes the resource allocation complicated, and increases the number of bits required.

So, a configuration may be used here to order non-standalone UEs to apply rate matching to resources where paging messages (PCHs) and/or the like are contained, via RRC signaling. In this case, rate matching may be executed in units of RBs, or rate matching may be applied to specific symbols and/or REs in specified RBs. Which symbols and/or REs are subject to rate matching may be determined in the specification.

(Radio Communication System) Now, the structure of the radio communication system according to one embodiment of the present invention will be described below. In this radio communication system, communication is performed using one or a combination of the herein-contained embodiments of the present invention.

Figure 13:
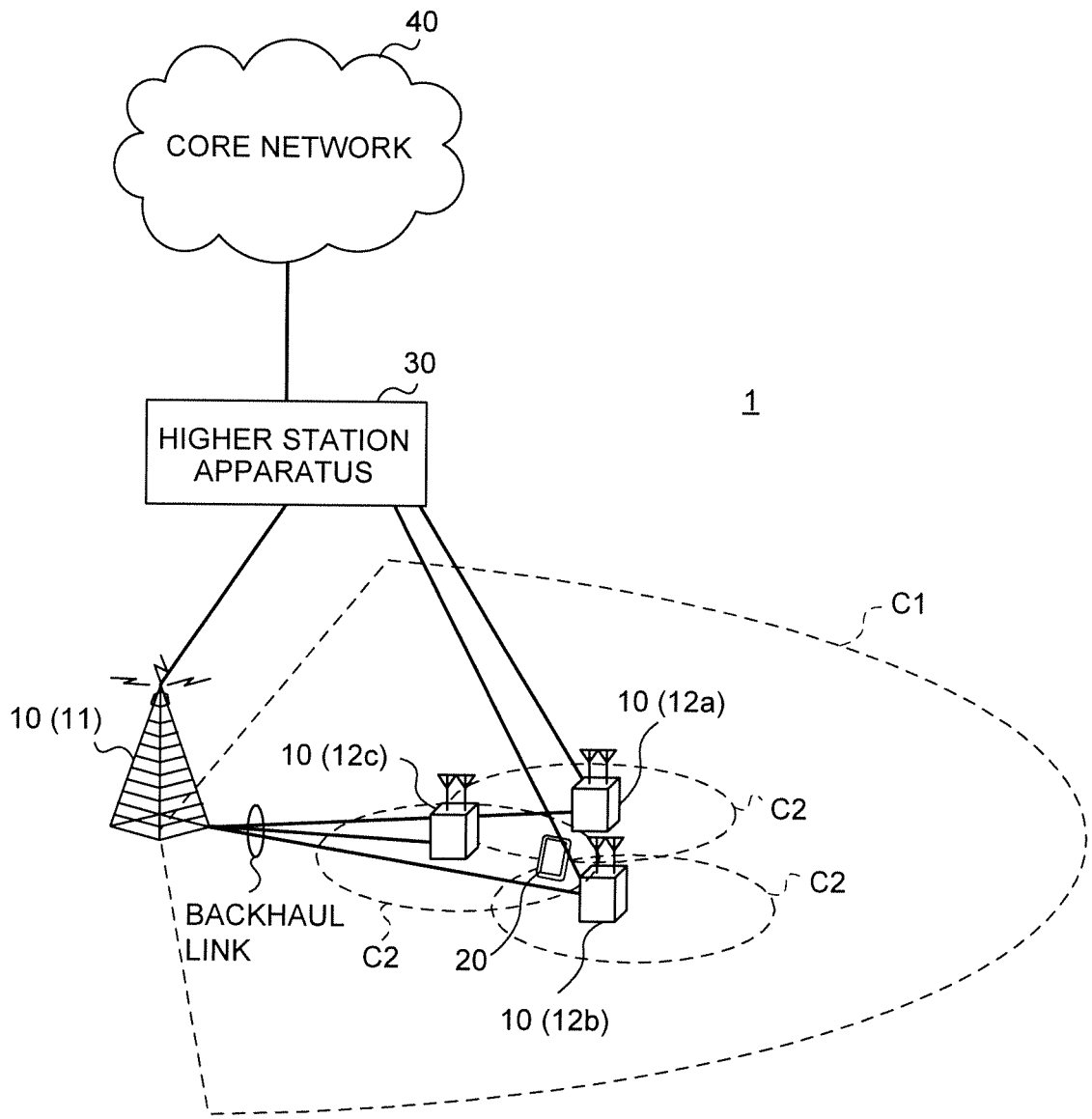
FIG. 13 is a diagram to show an example of a schematic structure of a radio communication system according to one embodiment of the present invention.

FIG. 13 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G, "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that uplink and downlink radio access schemes are not limited to the combination of these, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH. A shared control channel that reports the presence or absence of a paging channel is mapped to a downlink L1/L2 control channel (for example, PDCCH), and the data of the paging channel (PCH) is mapped to the PDSCH. Downlink reference signals, uplink reference signals and physical downlink synchronization signals are placed separately.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data and higher layer control information are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 14:
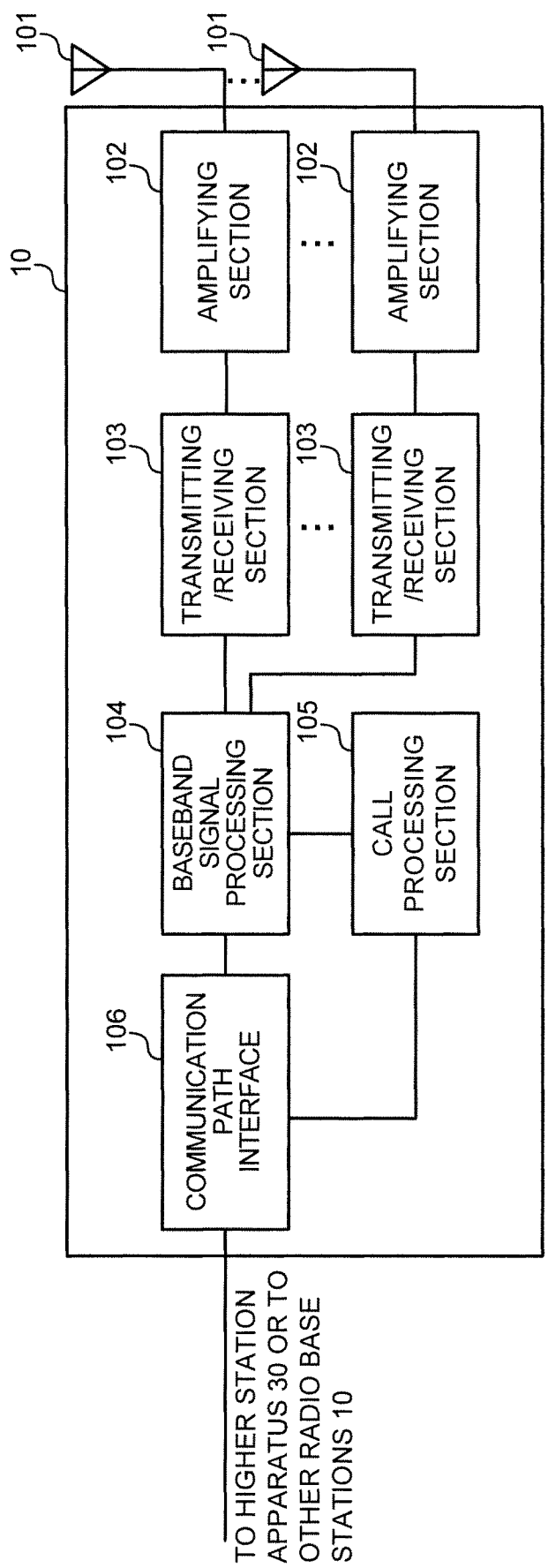
FIG. 14 is a diagram to show an example of an overall structure of a radio base station according to one embodiment of the present invention.

FIG. 14 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 include an analog beam forming section that is configured to be able to adopt both multi-beam approach and single-beam approach and which provides analog beam forming. When a synchronization signal and/or a paging channel are transmitted based on the multi-beam approach, beam sweeping is executed, whereby the beam is switched (sweeping) every one symbol or multiple symbols, which constitute one unit.

The beam forming section can be constituted by a beam forming circuit (for example, a phase shifter, a phase shifting circuit, etc.) or beam forming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 may transmit configuration information (BRS config.) related to reference signals for beam pattern measurements, and/or information related to beam indices.

Figure 15:
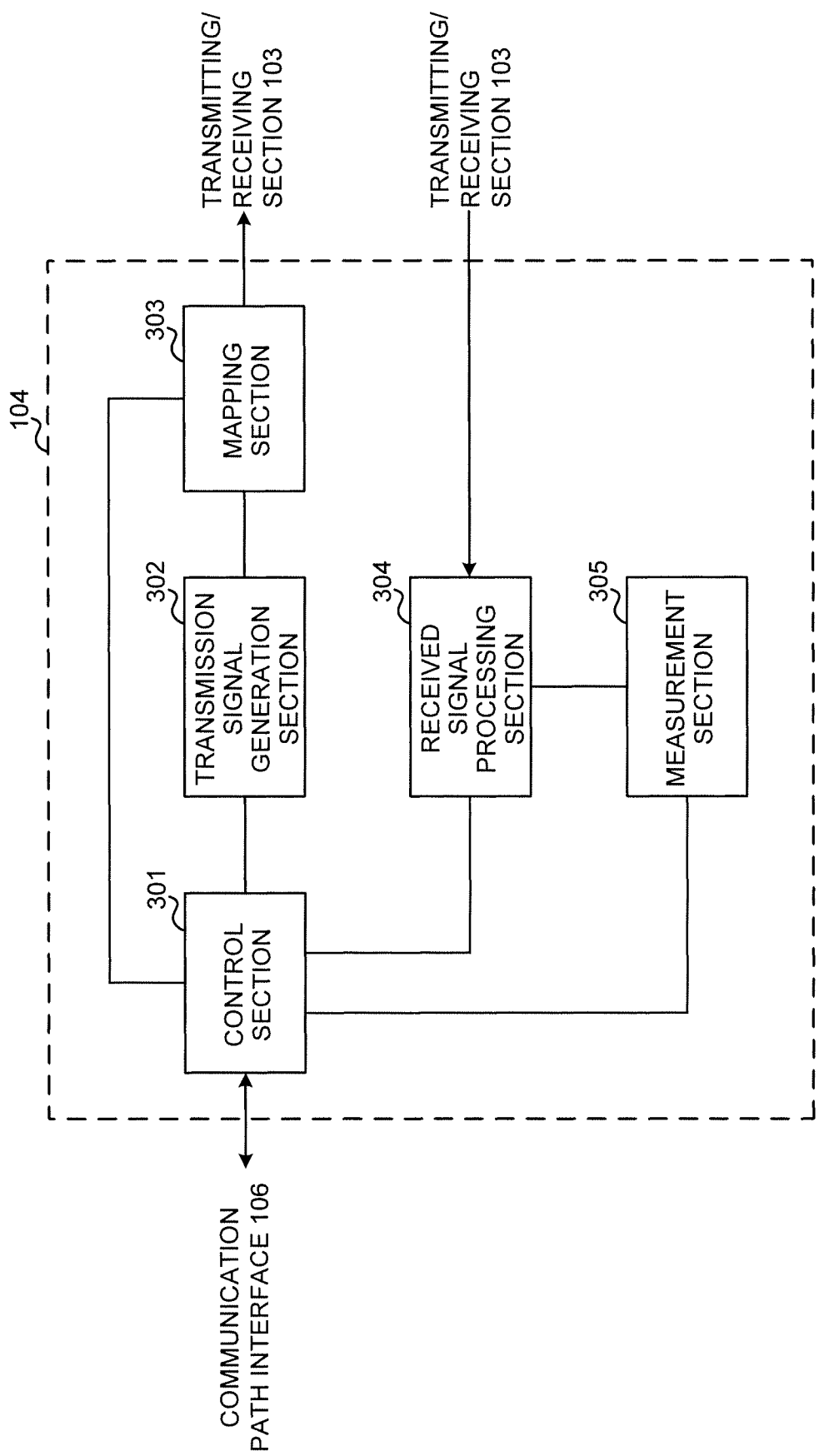
FIG. 15 is a diagram to show an example of a functional structure of a radio base station according to one embodiment of the present invention.

FIG. 15 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104. The baseband signal processing section 104 has digital beamforming functions for providing digital beamforming.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals by the transmission signal generation section 302 (including signals that correspond to synchronization signals, the MIB, the paging channel and/or others), the allocation of signals by the mapping section 303, and so on. As explained earlier with reference to the first aspect to the seventh aspect, resources (symbols, frequency resources, etc.) that are linked with resources (symbols, frequency resources, etc.) allocated to synchronization signals and/or MIBs and that are allocated to paging channels are controlled. Furthermore, the control section 301 controls the signal receiving processes in the received signal processing section 304, the measurements of signals in the measurement section 305, and so on.

The control section 301 controls scheduling of system information (SIBs, the MIB, etc.), downlink data signals that are transmitted in the PDSCH (including the PCH for paging messages), and downlink control signals that are transmitted in the PDCCH and/or the EPDCCH (covering, for example, resource allocation, the shared control channel that reports whether or not a paging message is present, the signal to report the multi-beam approach or the single-beam approach, and so on). When the control section 301 schedules a synchronization signal and/or the MIB and a paging channel (a signal that reports whether or not there is a paging to message, a paging message, etc.), the control section 301 schedules the synchronization signal and/or the MIB and the paging channel according to one of the resource arrangements described in the first aspect to the seventh aspect, or any combination of these, and controls each signal's resource arrangement. For example, the synchronization signal and/or the MIB, as well as at least part of the paging channel (a signal that reports whether or not there is a paging message) are allocated to the same symbol (first aspect).

Furthermore, the control section 301 controls scheduling so that the paging channel is not transmitted in all subframes that contain the synchronization signals and/or the MIB, but is transmitted only in part these subframes (second aspect).

Furthermore, although the control section 301 transmits the paging channel in subframes other than subframes in which the synchronization signals and/or the MIB are contained, the control section 301 may also control the scheduling and resource allocation so that the symbol (symbol index) to which the synchronization signal and/or the MIB are allocated and the symbol (symbol index) to which (at least part of) the paging channel is allocated match up between different subframes (third aspect).

In addition, the control section 301 controls the resource allocation so that a paging message (PCH) and the shared control channel to schedule the paging message can be transmitted in different symbols or in different subframes ((1) to (4) shown in the fourth aspect).

Furthermore, the control section 301 may control arrangement of resources so that resources where a plurality of user terminals go to read paging messages are distributed in the time direction (subframes or slots) and/or in the frequency direction (fifth aspect).

Furthermore, the control section 301 may fix the relative location of the paging message (PCH) resource with respect to the synchronization signal and/or the MIB and/or the like, by the specification. Alternatively, the control section 301 may exert control so that the resource for the paging message (PCH) is indicated to user terminals by using, for example, the synchronization signal and/or the MIB. Furthermore, the control section 301 may exert control so that paging message (PCH) resources are linked with UE-IDs and/or the like to allow different user terminals to assume different PCH resource locations (sixth aspect).

Furthermore, the control section 301 may control scheduling and resource allocation so that a signal to designate the multi-beam approach or the single-beam approach is placed in the MIB or a shared control channel that contains system information equivalent to the MIB (seventh aspect). The control section 301 controls the generation of downlink control signals (for example, delivery acknowledgement information and so on) and downlink data signals, based on the results of deciding whether or not retransmission control is necessary for uplink data signals, and so on. Also, the control section 301 controls the scheduling of downlink reference signals such as synchronization signals (for example, the PSS (Primary Synchronization Signal)/SSS (Secondary Synchronization Signal)), the CRS, the CSI-RS, the DM-RS and so on.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

The control section 301 may exert control so that transmitting beams and/or receiving beams are formed using the digital beam forming (for example, precoding) by the baseband signal processing section 104 and/or the analog beam forming (for example, phase rotation) by the transmitting/receiving sections 103.

For example, when the multi-beam approach is employed, the control section 301 may exert control so that, if a subframe (sweeping period) contains a synchronization signals and/or a broadcast channel and a paging channel, each symbol is transmitted in a different beamforming pattern by way of sweeping.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20. Also, based on commands from the control section 301, the transmission signal generation section 302 generates a signal that designates the multi-beam approach or the single-beam approach in the MIB or a shared control channel that contains system information equivalent to the MIB.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains. For example, part of the paging channel (for example, a shared control channel that reports whether or not there is a paging message) is mapped to the same symbol as the symbol where the synchronization signal and/or the broadcast channel are transmitted (first aspect). At this time, frequency resources that may be used for the shared control channel are confined within a range which centers around the frequency resource where the synchronization signal and/or the MIB are mapped (for example, the center frequency), and which may be defined by the specification, or within a range that is reported by RRC signaling.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), channel states and so on. The measurement results may be output to the control section 301.

(User Terminal)

Figure 16:
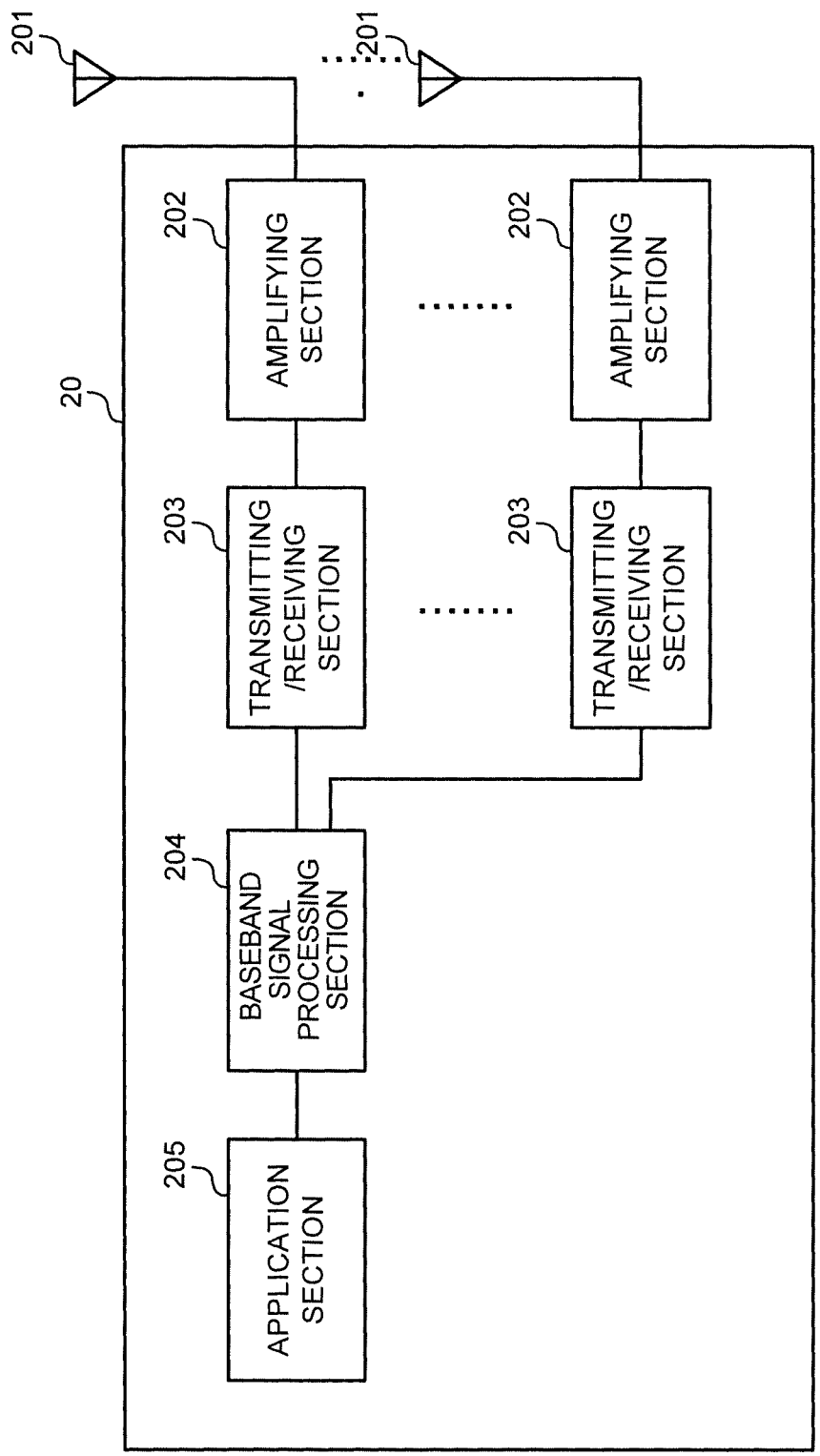
FIG. 16 is a diagram to show an example of an overall structure of a user terminal according to one embodiment of the present invention.

FIG. 16 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 control the transmission of Msg. 1 and Msg. 3 and the receipt of Msg. 2 and Msg. 4 in random access procedures. In addition, the transmitting/receiving sections 203 may receive configuration information (BRS config.) related to reference signals for beam pattern measurements, and/or information related to beam indices. In addition, the transmitting/receiving sections 203 can transmit Msg. 1 and/or Msg. 3 in resources corresponding to a predetermined beam group that is selected from a plurality of beam groups. In addition, the transmitting/receiving sections 203 can receive Msg. 2 and/or Msg. 4 in resources corresponding to a predetermined beam group.

Figure 17:
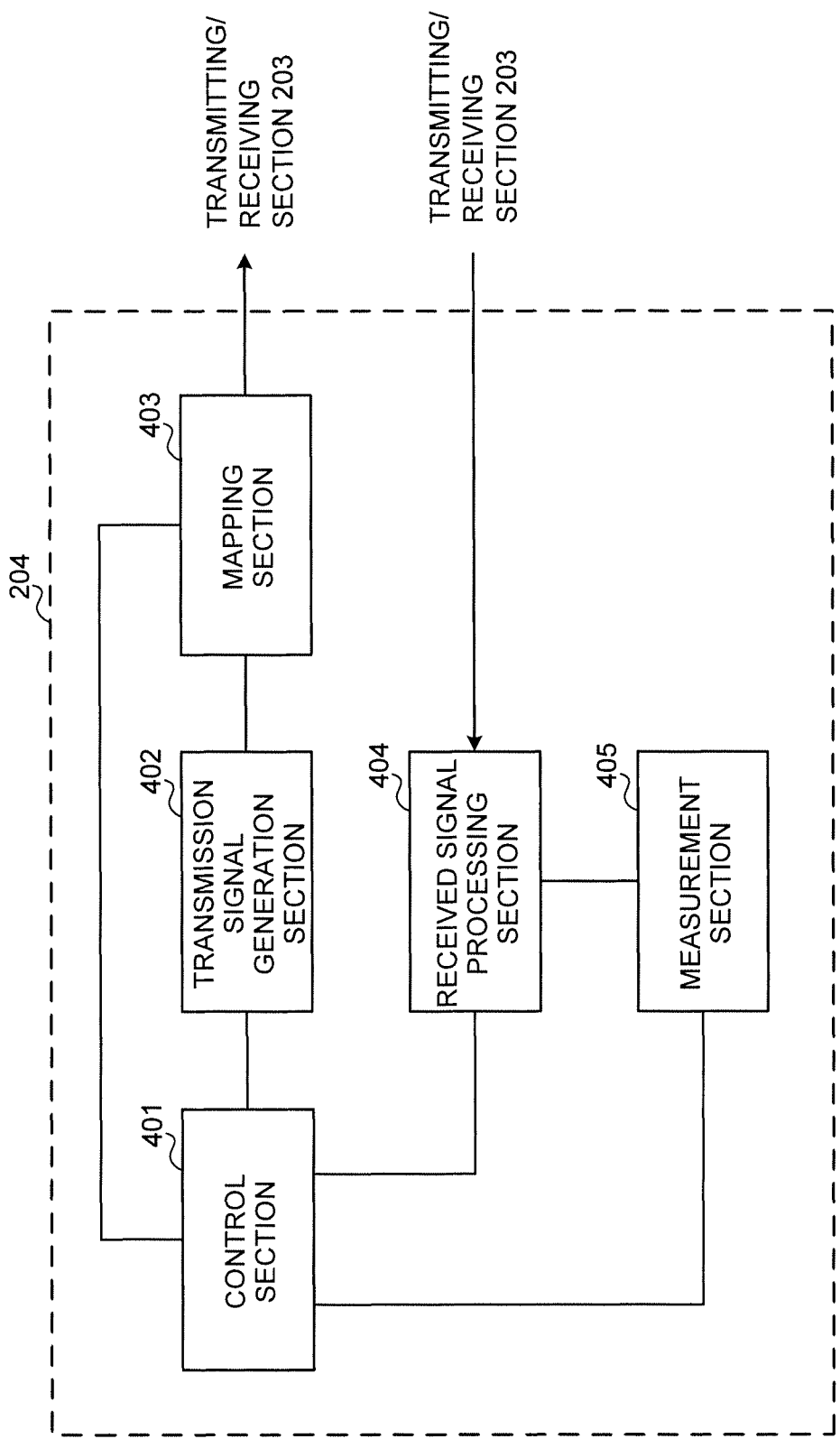
FIG. 17 is a diagram to show an example of a functional structure of a user terminal according to one embodiment of the present invention.

FIG. 17 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203.

For example, the control section 401 receives at least one beam that is directed to the subject terminal, out of a plurality of beams transmitted in a predetermined time period (for example, a sweeping period).

In addition, the control section 401 may control the receiving operation so that a synchronization signal and/or a broadcast channel are received from the radio base station before a random access preamble is transmitted, and the paging channel is received by monitoring resources that are determined based on the detection result of these.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 receives a paging channel, which the radio base station transmits by applying beamforming, based on a command from the control section 401. As described in the first aspect to the seventh aspect, the received signal processing section 404 identifies the resource (symbol, frequency resource, etc.) allocated to the paging channel based on the detection result of the resource (symbol, frequency resource, etc.) where the synchronization signal and/or the broadcast channel are detected. For example, when a synchronization signal and/or a broadcast channel (MIB), a shared control channel that reports whether or not there is a paging message, and a paging message (PCH) are mapped to frequency fields on the same symbol, the received signal processing section 404 searches for the shared control channel that reports whether or not there is a paging message, inside the same symbol as where the synchronization signal and/or the broadcast channel are detected. If the frequency resources where the above shared control channel may be mapped are confined within a certain range centered around the frequency resource to which the synchronization signal and/or the MIB are mapped or within a predetermined resource range, the received signal processing section 404 searches this limited resource range (first aspect and second aspect).

Also, the received signal processing section 404 may receive the paging channel in subframes other than subframes containing the synchronization signal and/or the MIB, based on commands from the control section 401. In this case, when a subframe to carry the paging channel is received, the received signal processing section 404 searches for (at least part of) the paging channel in the same symbol as the symbol in which the synchronization signal and/or the MIB were detected when another subframe was received (third aspect).

Also, the received signal processing section 404 may also receive a paging message (PCH) and the shared control channel to schedule the paging message, in different symbols or in different subframes, based on commands from the control section 401. The paging message (PCH) and the shared control channel to schedule the paging message may be associated with each other in one or a combination of four patterns (1) to (4), which have been described in the fourth aspect, the received signal processing section 404 performs the receiving operation based on these patterns (fourth aspect).

In addition, the received signal processing section 404 receives a subframe containing paging messages that are distributed in the time direction (subframes, slots, etc.) and/or the frequency direction so as to prevent multiple user terminals from concentrating, and operates to detect the paging message addressed to the subject user terminal from the corresponding resource (fifth aspect).

Also, the received signal processing section 404 may determine the resource where the user terminal should go to read the paging message (PCH), based on a relative location with respect to the synchronization signal and/or the MIB and so on, as commanded by the control section 401. Alternatively, the received signal processing section 404 may operate so that the user terminal goes to a resource location that is reported using the synchronization signal and/or the MIB and so on, and read the paging message (PCH) there. Furthermore, the received signal processing section 404 may determine the PCH resource associated with the UE-ID and/or the like by calculation (sixth aspect).

In addition, the control section 401 and the received signal processing section 404 detect the MIB or a shared control channel that contains system information equivalent to the MIB, and change the method of detecting paging channels depending on which one of the multi-beam approach and the single-beam approach is designated in the shared control channel (seventh aspect).

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using the beamforming RS transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 18:
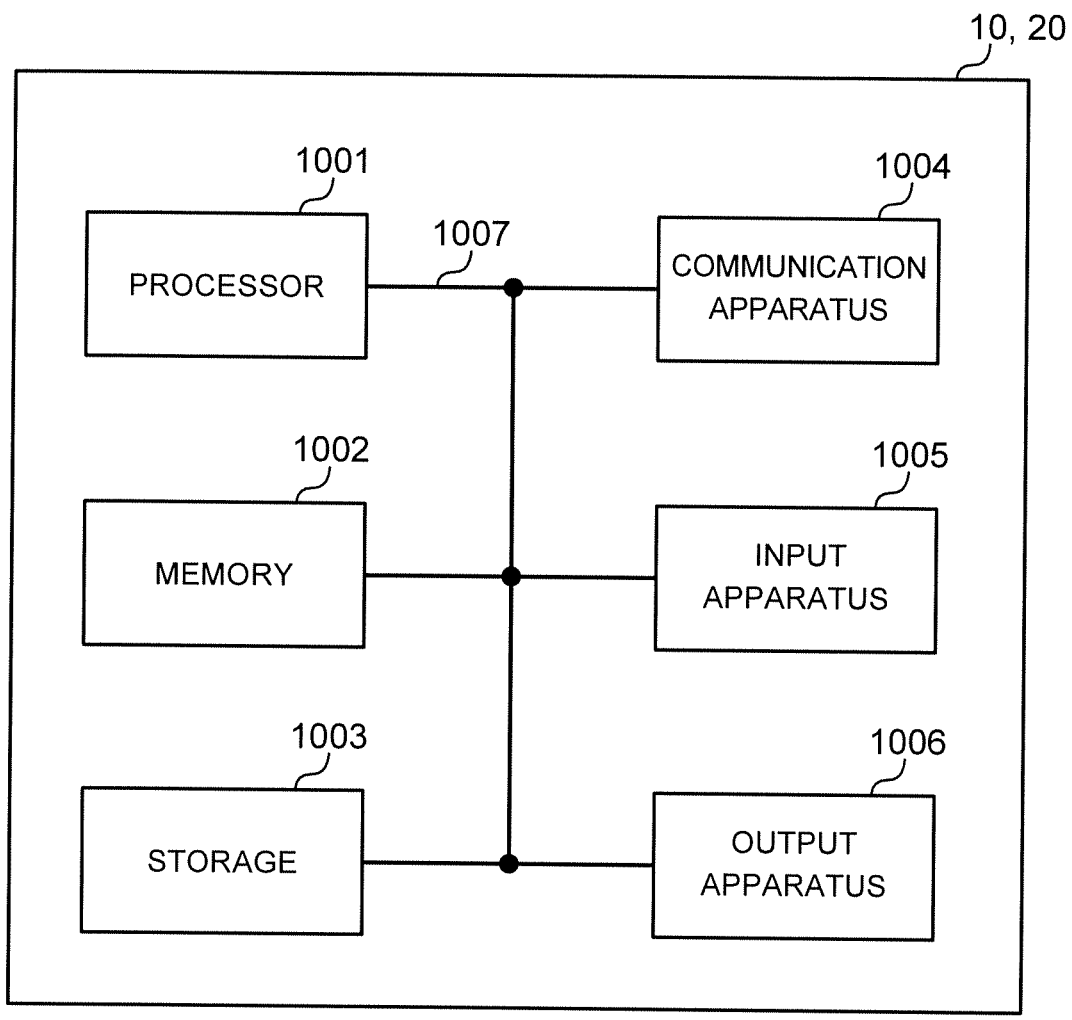
FIG. 18 is a diagram to show an example of a hardware structure of a radio base station and a user terminal according to one embodiment of the present invention.

For example, the radio base station, user terminals and so on according to embodiments of the present invention may function as a computer that executes the processes of the radio communication method of the present invention. FIG. 18 is a diagram to show an example hardware structure of a radio base station and a user terminal according to one embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations) Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-154016, filed on Aug. 4, 2016, including the specification, drawings and abstract, is incorporated herein by reference in its entirety.

The invention claimed is:

1. A terminal comprising:
a receiver that receives a signal including at least one of a synchronization signal and a broadcast channel; and
a processor that controls reception of a physical downlink control channel (PDCCH), to which downlink control information (DCI) scrambled by a paging identifier (P-RNTI) is mapped,
wherein the DCI is located in a same symbol as the signal,
wherein the processor specifies a frequency resource for the DCI that is offset in a frequency direction with respect to a frequency resource of the signal,
wherein the processor controls reception of the DCI based on a timing that is determined based on identification information of the terminal, and
wherein the processor monitors the DCI in the timing of the terminal, per each cycle of discontinuous reception in an idle state.

2. The terminal according to claim 1, wherein the processor determines the frequency resource for the DCI based on a frequency position of a resource where the signal is received.

3. The terminal according to claim 1, wherein the processor controls reception of a downlink shared channel for paging located in a different symbol from a symbol where the DCI is received.

4. The terminal according to claim 1, wherein
a symbol for receiving the DCI is within a time period consisting of a given number of symbols, and
the processor controls reception of a downlink shared channel in the symbol within the time period.

5. The terminal according to claim 1, wherein the processor controls reception of a message located in the same symbol of the signal.

6. The terminal according to claim 5, wherein the receiver receives, as the message, at least one of system information modification indication, an Earthquake and Tsunami Warning System (ETWS), and a Commercial Mobile Alert Service (CMAS).

7. A radio communication method for a terminal comprising:
receiving a signal including at least one of a synchronization signal and a broadcast channel; and
controlling reception of a physical downlink control channel (PDCCH), to which downlink control information (DCI) scrambled by a paging identifier (P-RNTI) is mapped,
wherein the DCI is located in a same symbol as the signal,
wherein the terminal specifies a frequency resource for the DCI that is offset in a frequency direction with respect to a frequency resource of the signal,
wherein the terminal controls reception of the DCI based on a timing that is determined based on identification information of the terminal, and
wherein the terminal monitors the DCI in the timing of the terminal, per each cycle of discontinuous reception in an idle state.

8. A base station comprising:
a transmitter that transmits, to a terminal, a signal including at least one of a synchronization signal and a broadcast channel; and
a processor that controls transmission of a physical downlink control channel (PDCCH), to which downlink control information (DCI) scrambled by a paging identifier (P-RNTI) is mapped,
wherein the DCI is located in a same symbol as the signal,
wherein the terminal specifies a frequency resource for the DCI that is offset in a frequency direction with respect to a frequency of the signal,
wherein the terminal controls reception of the DCI based on a timing that is determined based on identification information of the terminal, and
wherein the terminal monitors the DCI in the timing of the terminal, per each cycle of discontinuous reception in an idle state.

9. A system comprising:
a base station; and
a terminal, wherein
the base station comprises:
a transmitter that transmits, to the terminal, a signal including at least one of a synchronization signal and a broadcast channel; and
a processor of the base station that controls transmission of a physical downlink control channel (PDCCH), to which downlink control information (DCI) scrambled by a paging identifier (P-RNTI) is mapped,
wherein the DCI is located in a same symbol as the signal; and
the terminal comprises:
a receiver that receives the signal including at least one of the synchronization signal and the broadcast channel; and
a processor of the terminal that controls reception of the PDCCH, to which the DCI scrambled by P-RNTI is mapped,
wherein the DCI is located in a same symbol as the signal,
wherein the processor of the terminal specifies a frequency resource for the DCI that is offset in a frequency direction with respect to a frequency resource of the signal,
wherein the processor of the terminal controls reception of the DCI based on a timing that is determined based on identification information of the terminal, and
wherein the processor of the terminal monitors the DCI in the timing of the terminal, per each cycle of discontinuous reception in an idle state.

* * * * *